US006960842B2

(12) United States Patent
Ziegler et al.

(10) Patent No.: US 6,960,842 B2
(45) **Date of Patent: *Nov. 1, 2005**

(54) INTEGRATED UNINTERRUPTIBLE POWER SUPPLY ENCLOSURE

(75) Inventors: William Ziegler, Reading, MA (US); Michael Manganese, Peabody, MA (US); Paul A. Jordan, Wakefield, MA (US); Mark Calvanese, Hudson, MA (US); Joseph Dechene, Nashua, NH (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/749,785

(22) Filed: Dec. 30, 2003

(65) Prior Publication Data

US 2004/0155528 A1 Aug. 12, 2004

Related U.S. Application Data

(63) Continuation of application No. 09/778,446, filed on Feb. 6, 2001, now Pat. No. 6,693,371.

(51) Int. Cl.$^{7}$ .................................................. H02J 7/00
(52) U.S. Cl. ........................................................ 307/64
(58) Field of Search ............................................ 307/64

(56) References Cited

U.S. PATENT DOCUMENTS 5,260,851 A * 11/1993 Chiou ........................ 361/685
5,642,260 A * 6/1997 Sigl ........................... 361/695
5,867,367 A * 2/1999 Barrow ....................... 361/752
5,917,696 A * 6/1999 Peng .......................... 361/686
5,994,794 A * 11/1999 Wehrlen ...................... 307/66
6,082,842 A * 7/2000 Ho ........................... 312/257.1

* cited by examiner

*Primary Examiner*—Robert L. Deberadinis
(74) *Attorney, Agent, or Firm*—Shane Hu Hunter; Mintz, Levin, Cohn, Ferris, Glovsky and Popeo, P.C.

(57) ABSTRACT

The present invention provides an uninterruptible power supply (UPS) having a chassis formed using mating panels of a sturdy, lightweight, substantially rigid material, such as ABS plastic, that are fixedly attached together to form a compact, user-friendly chassis using simple connection techniques that entail a minimum of tools and a minimal number of fastening mechanisms. In one general aspect, a UPS in accordance with the invention comprises an input to receive AC power from an AC power source, an output that provides AC power, a DC voltage source that provides DC power, the DC voltage source having an energy storage device, an inverter operatively coupled to the DC voltage source to receive DC power and to provide AC power, a transfer switch constructed and arranged to select one of the AC power source and the DC voltage source as an output power source for the uninterruptible power supply, and a chassis for housing at least the DC voltage source, inverter, and transfer switch. The chassis, in accordance with the invention, comprises a first panel having a substantially "L" shaped appearance, a second panel constructed and arranged to mate to the first panel, and a first fastener securing the first panel and the second panel into a substantially fixed configuration.

16 Claims, 31 Drawing Sheets

INTEGRATED UNINTERRUPTIBLE POWER SUPPLY ENCLOSURE

This application is a continuation of Ser. No. 09/778,446 filed Feb. 6, 2001 now U.S. Pat. No. 6,693,371.

RELATED APPLICATIONS

This application is related to a commonly assigned application having the title "Battery Wire Lead Management," having Ser. No. 09/772,747 and filed on Jan. 30, 2001, and the disclosure of this related application is hereby incorporated by reference.

FIELD OF THE INVENTION

Embodiments of the present invention are directed towards an enclosure or chassis of a device, particularly an electronic device such as an uninterruptible power supply (UPS), for receiving the components of the device. The components typically contained within such an enclosure include printed circuit boards (PCBs), transformers, batteries, switches, and the like. The enclosure is used to house and hold the device components in a fixed, mechanically stable location. More particularly, embodiments of the present invention are directed towards a lightweight, inexpensive enclosure having a simplified assembly process and, in particular, to apparatuses, systems, and methods for providing a UPS housed in an integrated, lightweight, low-cost, and easily assembled package.

BACKGROUND OF THE INVENTION

An uninterruptible power supply (UPS) is a type of power supply used to power and protect an electrical load that is sensitive to fluctuations in or the absence of electrical power. The UPS can be connected between the load and a source of electrical power, such as a mains power source or other commercially provided electric power. The UPS uses commercially supplied AC power to charge a DC battery and provide the AC power to load. Upon outages of power, the load draws its AC power from the DC battery through the DC to AC inverter. This isolates the load from power surges or brownouts and also furnishes a source of power during brief outages.

Commonly, a UPS comprises a rectifier, inverter, battery charger, DC battery, and other components, all housed within a single case or package. FIG. 1 shows a typical prior art UPS 1 used to provide regulated uninterrupted power. The UPS 1 includes an input filter/surge protector 2, a transfer switch 3, a controller 4, a battery 5, a battery charger 6, an inverter 7, and a DC—DC converter 8. The UPS also includes an input 9 for coupling to an AC power source and an outlet 10 for coupling to a load.

The UPS 1 operates as follows. The filter/surge protector 2 receives input AC power from the AC power source through the input 9, filters the input AC power and provides filtered AC power to the transfer switch 3 and the battery charger 6. The transfer switch 3 receives the AC power from the filter/surge protector 2 and also receives AC power from the inverter 7. The controller 4 determines whether the AC power available from the filter/surge protector is within predetermined tolerances, and if so, controls the transfer switch to provide the AC power from the filter/surge protector to the outlet 10. If the AC power from the rectifier is not within the predetermined tolerances, which may occur because of "brown out," "high line," or "black out" conditions, or due to power surges, then the controller 4 controls the transfer switch 3 to provide the AC power from the inverter 7. The DC—DC converter 8 is an optional component that converts the output of the battery 5 to a voltage that is compatible with the inverter 7. Depending on the particular inverter 7 and battery 5 used the inverter 7 may be operatively coupled to the battery 5 either directly or through a DC—DC converter 8.

As consumer electronic products such as computers, become more widespread, smaller, lightweight, and less expensive, there has been a corresponding increase in the need for smaller, lighter, lower-cost UPS systems. However, designers of electronic instruments such as UPS's typically have focused their energies on reducing the size and cost of the components contained within the device rather than redesigning the chassis or housing of the instrument. Thus, presently available UPS devices still take much time to assemble and require many connectors and fasteners that increase both weight and manufacturing cost. In addition, because parts such as batteries and transformers are heavy and awkward to install, it is difficult to design a simplified, lightweight UPS enclosure capable of securely containing such components.

Known enclosures and chassis designs for a UPS commonly include a metal frame having several partitions or walls to which the components are mounted or attached. The frame itself can be fastened to an outer device housing. Manufacturing the prior art chassis for a UPS is a relatively complicated and time-consuming process. For example, making a metal chassis often requires stamping and bending metal sheets. The surfaces of the sheets may be treated, for example by galvanizing, before connecting the sheets to each other by an appropriate connection method, such as screwing, welding, riveting, adhesives, or a combination of these methods. Components are connected to the chassis by fastening elements like screws or rivets or other connection techniques. Sometimes components are connected to the sheets before the sheets are assembled together.

It is also known to use hard plastic parts to form a chassis, but known plastic chassis designs nonetheless result in a complicated and time-consuming assembly process, because the fastening elements still must be attached to the chassis, for example by ultrasound welding, gluing, or pressing. Moreover, it is less common to use known plastic chassis designs for electronic devices such as UPS's, which typically include very heavy components such as transformers and batteries. These heavy components (and even the relatively lighter components, such as printed circuit boards (PCBs), often require additional holding members, such as brackets or angle plates, to hold the component securely at the preferred position within the chassis. The holding members add to the weight, cost, and complexity of the chassis.

Thus, making a chassis for electronic instruments such as a UPS and assembling its components to it is costly and time-consuming, requiring the use of mounting tools, such as screw drivers, bending tools, riveting tools, welding tools, or adhesive dispensers. Metallic enclosures add an unnecessary amount of weight to the electronic instrument, but known plastic enclosures still require supporting members, if they are to be used with electronic instruments having particularly heavy components.

SUMMARY OF THE INVENTION

It is one object of the present invention to alleviate the aforementioned difficulties in assembly and manufacture of electronic instruments such as UPS devices by providing a UPS formed using mating panels of a sturdy, lightweight, substantially rigid material, such as ABS plastic, where the panels are fixedly mounted together to form a compact, user-friendly chassis using simple connection techniques that entail a minimum of tools and a minimal number of external fasteners.

In one general aspect, the invention provides an uninterruptible power supply for providing AC power to a load. The uninterruptible power supply comprises an input to receive AC power from an AC power source, an output that provides AC power, a DC voltage source that provides DC power, the DC voltage source having an energy storage device, an inverter operatively coupled to the DC voltage source to receive DC power and to provide AC power, a transfer switch constructed and arranged to select one of the AC power source and the DC voltage source as an output power source for the uninterruptible power supply, a chassis for housing at least the DC voltage source, inverter, and transfer switch. The chassis, in accordance with the invention, comprises a first panel having a substantially "L" shaped appearance, a second panel constructed and arranged to mate to the first panel; and a first fastener securing the first panel and the second panel into a substantially fixed configuration.

The chassis can be formed from a material such as plastic, semi-rigid polycarbonate (PC), Acrylonitrile-Butadiene-Styrene (ABS), ABS/PC, flame-retardant PC, ABS and ABS/PC products, polyvinyl chloride (PVC), polystyrene, high impact polystyrene (HIPS), polybutylene Terephthalate (PET), PC/PET, polybutylene terephthalate (PBT), PC/PBT, polyetherimide (PEI), acetal copolymer (POM), engineering thermoplastics (ETP), polyamides, expanded polypropylene (EPP), polyurethane, polyethylene, and metal.

The chassis, in one embodiment, also can comprise a third panel constructed and arranged to mate to the first panel and the second panel, wherein the first fastener is coupled to the third panel. The third panel can attach to the first panel using the first fastener and to the second panel using a second fastener.

At least one of the first and second panels can further include an integrally formed latch and the third panel can further include an integrally formed hook constructed and arranged to pivotably engage the latch. The input to the UPS can further comprise a line cord assembly constructed and arranged to mate with a line cord opening integrally formed into the third panel. The line cord assembly can further comprise an integrally formed strain relief element operably engaging the line cord opening. In addition, the line cord assembly can further comprise an integrally formed detent constructed and arranged to catch the line cord opening to keep the line cord assembly attached to the rear panel.

It is another object of the invention to provide a UPS chassis having integral preformed recesses capable of receiving and attaching electronic components therein, including heavy components such as transformers, using few, if any, fastening elements and simplified connection techniques, whereby the entire UPS can be assembled quickly and easily along a single axis of manufacture, using a minimum of tools.

In another general aspect, the invention provides an uninterruptible power supply for providing AC power to a load. The uninterruptible power supply comprises an input to receive AC power from an AC power source, an output that provides AC power a DC voltage source that provides DC power, the DC voltage source having an energy storage device, an inverter operatively coupled to the DC voltage source to receive DC power and to provide AC power, a transfer switch constructed and arranged to select one of the AC power source and the DC voltage source as an output power source for the uninterruptible power supply, a chassis for housing at least the DC voltage source, inverter, and transfer switch. The chassis, in accordance with the invention, comprises a first panel having a substantially "L" shaped appearance, a second panel constructed and arranged to mate to the first panel, and a first fastener securing the first panel and the second panel into a substantially fixed configuration, wherein at least one of the first and second panels comprises at least one integrated fastening element constructed and arranged to attach one or more components of the UPS to the chassis.

At least one of the first and second panels can further comprise an integrated fastener, such as a hook, constructed and arranged to attach a printed circuit board to the respective panel. At least one of the first panel and second panel can further includes at least one crush rib constructed and arranged to hold a component disposed adjacent to the crush rib, such as a transformer, in a substantially fixed position.

The second panel can further comprise an integrally formed compartment, which compartment can be constructed and arranged to enclose one or more UPS components, such as the energy storage device. The chassis can include a movable access panel providing access to the compartment. The movable access panel could be completely removed to permit installation or removal of one or more components, such as batteries, contained within the compartment.

It is another object of the invention to provide a method for constructing an uninterruptible power supply using a minimal number of tools and fasteners.

The foregoing and other objects, aspects, features, and advantages of the present invention will become more apparent from the following detailed description of the invention when viewed in conjunction with the accompanying drawings.

BRIEF DESCRIPTION OF THE DRAWINGS

An understanding of the principles of the invention may be readily attained by reference to the following specification and the accompanying drawings in which.

DETAILED DESCRIPTION OF THE PREFERRED EMBODIMENTS

Figure 2A:
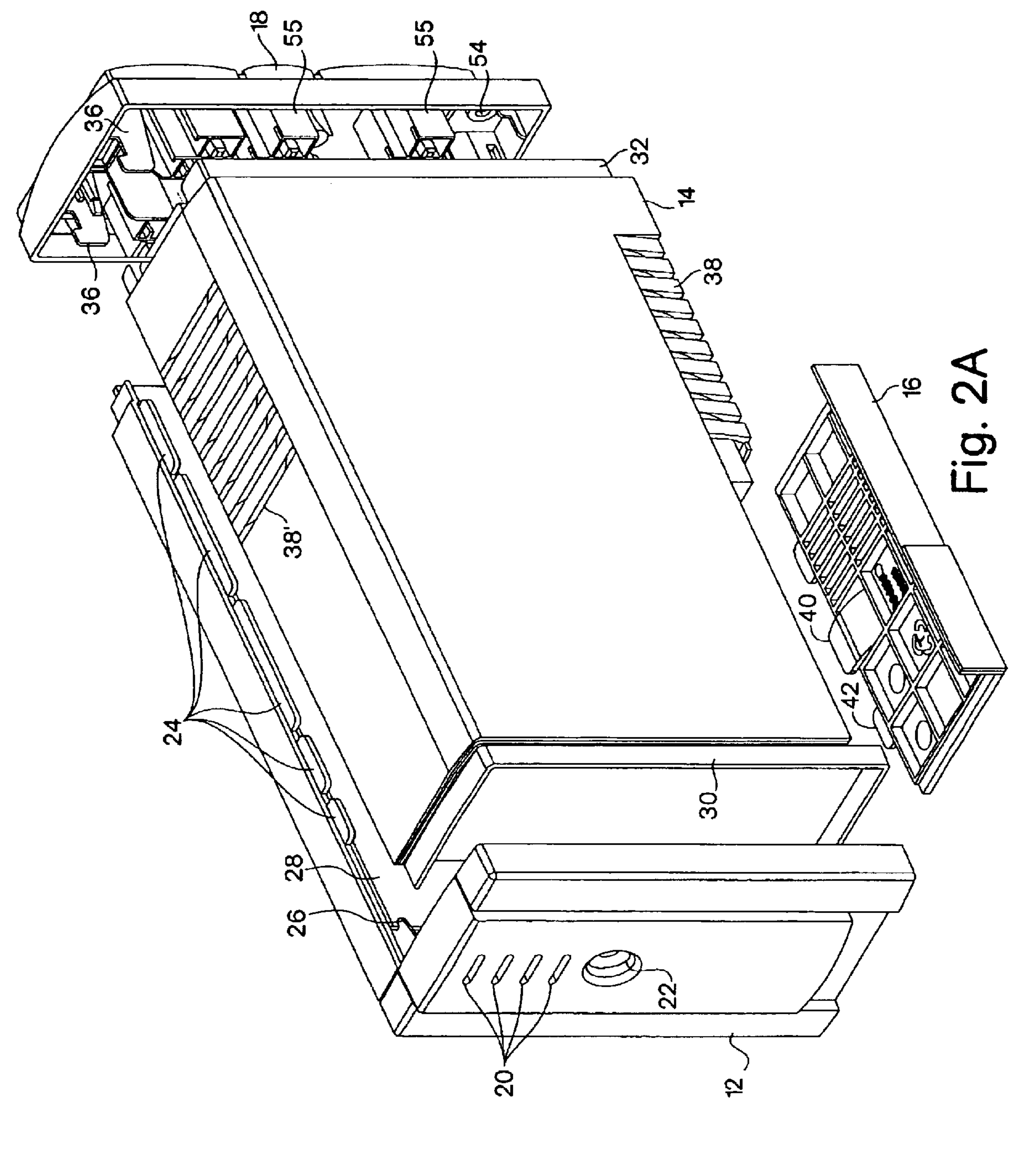
FIGS. 2A and 2B are partially exploded front and rear perspective views, respectively, of a UPS chassis, in accordance with one embodiment of the invention.

FIG. 2A is a partially exploded front perspective view of a chassis 11, in accordance with one embodiment of the invention. In this embodiment, the chassis 11 is used to contain a UPS device. The chassis 11 is in the general shape of a substantially rectangular box having top and bottom opposing sides, front and back opposing sides, and left and right opposing sides. The chassis 11 comprises a left panel 12, a right panel 14, a battery door 16 slideably engaged with the right panel 14, and a rear panel 18. The left panel 12 is a single integral piece that forms the left side and front side. The right panel 14 is a single integral piece that forms the right side, top side, and a portion of the bottom side. The battery door 16 is a single integral piece that forms the remaining portion of the bottom side, while the rear panel 18 forms the rear side.

In other embodiments, the chassis 11 can have a shape other than that of a rectangular box, such as a square box, a trapezoidal box, a box having a hexagonal shape, a substantially cylindrical box, a substantially circular or semi-circular box, a substantially oval box, and the like. Those skilled in the art will recognize that a box having any of these shapes, in accordance with the invention, can be comprised of a minimal number of panels, formed in accordance with the principles and advantages recited herein.

As will be described further herein, the chassis 11 is held together by constructing and arranging the left panel 12, right panel 14, battery door 16, and rear panel 18 to mate together without fasteners, although in one embodiment the chassis 11 further includes a first screw (not visible in FIG. 2A) attaching the rear panel 18 to the right panel 12 and a second screw (not visible in FIG. 2A) attaching the rear panel 18 to the left panel 14. Other types of fastening techniques, such as welds, rivets, adhesives, etc. are of course usable in place of the screws.

The chassis 11 is made from any sturdy material capable of being formed into the integral component pieces (i.e., the left, right, and rear panels 12, 14, and 18, respectively, and the battery door 16) described herein. In a preferred embodiment, the chassis 11 is manufactured in a low-cost and rapid manner by molding the respective portions (namely, the left panel 12, right panel 14, battery door 16, and rear panel 18) from a lightweight, low-cost material such as plastic.

In different embodiments, the chassis 11 can be made from materials such as polycarbonate (PC), Acrylonitrile-Butadiene-Styrene (ABS), ABS/PC, flame-retardant PC, ABS and ABS/PC products, polyvinyl chloride (PVC), polystyrene, high impact polystyrene (HIPS), polybutylene Terephthalate (PET), PC/PET, polybutylene terephthalate (PBT), PC/PBT, polyetherimide (PEI), acetal copolymer (POM), or other similar plastic materials, in accordance with UPS regulatory and operational requirements.

While the embodiments described herein are made from a synthetic, moldable material, so that all recesses for receiving the components can be manufactured by a single forming step, it should be understood that the UPS design in accordance with the principles of the invention could also be achieved by other manufacturing techniques capable of producing the respective parts of the chassis effectively, in a quick, simple, low-cost, or otherwise improved manner. For example, the chassis parts could be formed by milling, punching, filing, or cutting the respective parts of the chassis out of a solid material, such as a solid plastic material. It also should be understood that the chassis could be made using materials of biological or metallic origin that possess the desired mechanical qualities. Details of the above-described materials and the manufacturing methods are well known to those skilled in the plastics and materials arts and need not be disclosed herein in detail.

It further should be understood that the different parts of the chassis (e.g., the left panel 12 right panel 14, battery door 16, and rear panel 18) can be made from different types of material than the other parts, so long as the parts are constructed to mate together securely.

Figure 8B:
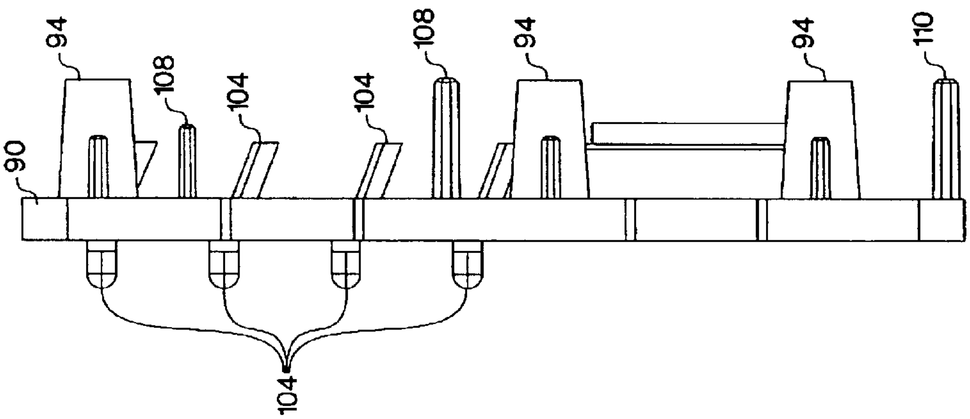
FIGS. 8A, 8B, 8C, and 8D are enlarged front perspective, side, rear perspective, and rear views, respectively of the lightpipe of FIG. 5.
Figure 8A:
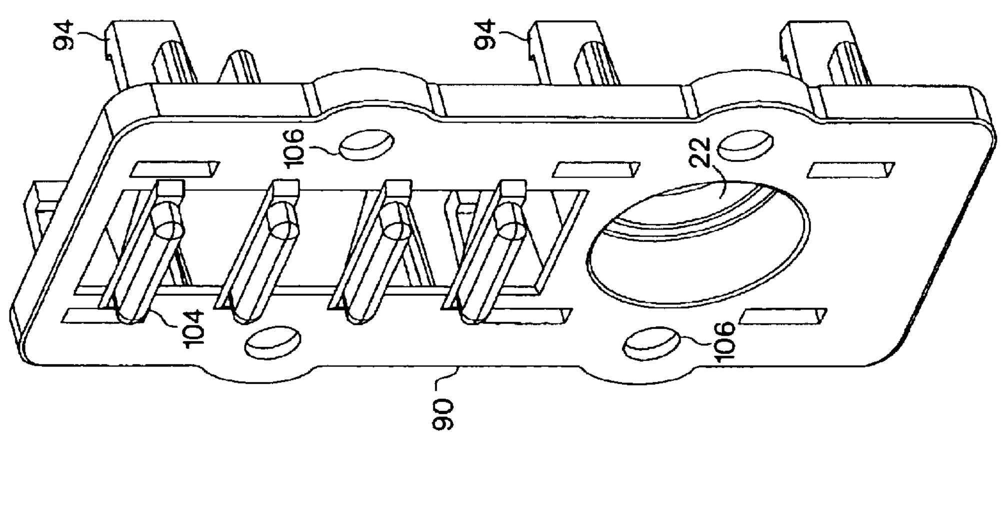
Figure 8D:
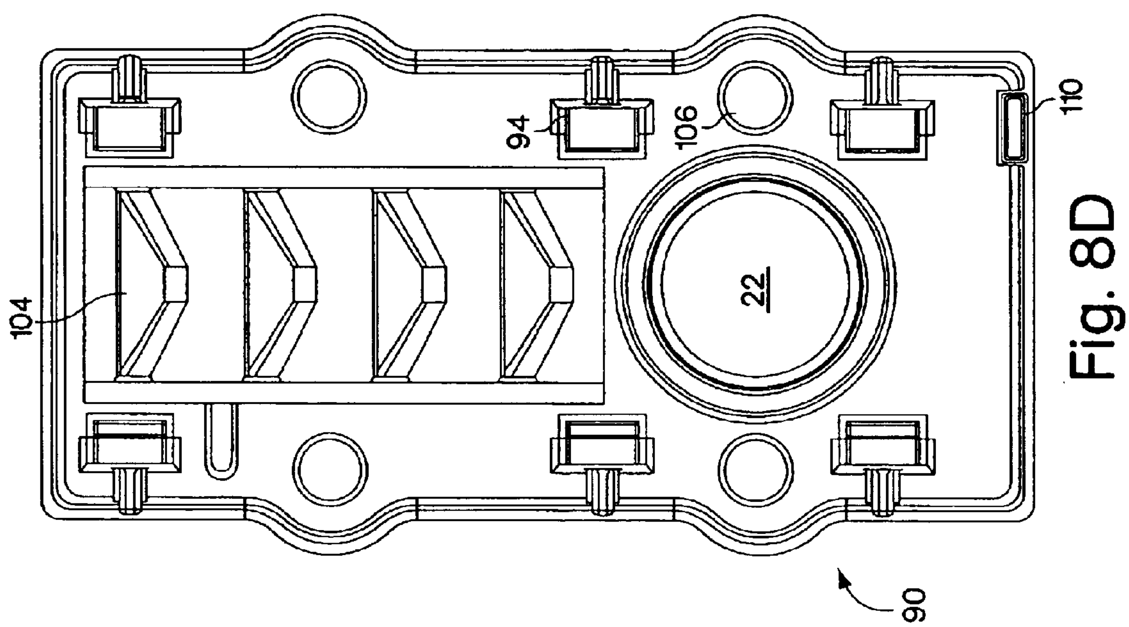
Figure 8C:
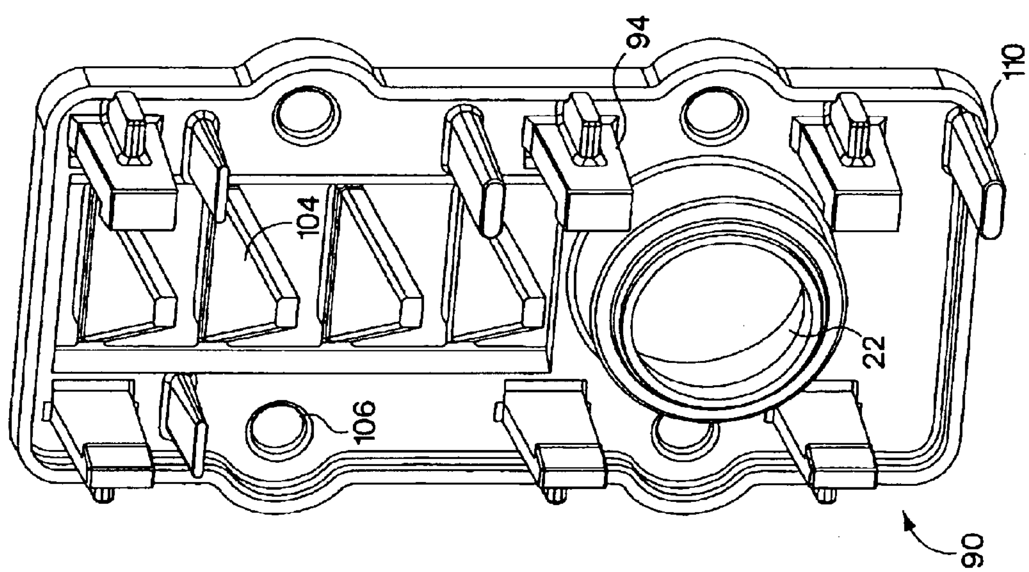

Referring again to FIG. 2A, it can be seen that the left panel 12 forms the front face and left side of the chassis 11. Integrating the front face and the left side together reduces the overall parts count for the chassis 11, eases the manufacture of the UPS, and improves the overall rigidity of the chassis 11 by eliminating a seam between its front side and the left side. The front panel portion of the left panel 12, in one embodiment, includes a plurality of indicator openings 20 and a switch opening 22 usable with a pushbutton-type switch. The indicator openings 20 and switch opening 22, in one embodiment, mate with a light pipe assembly (see FIGS. 8A through 8B), which is described further herein.

At least one top tab 24 located on the top innermost side of the left panel 12 engages a slot (see FIG. 3B) integrally formed on the top side of the right panel 14, to secure the left panel 12 to the right panel 14 along the top left side of the chassis 11. In one embodiment, the left panel provides a plurality of separate top tabs 24 integrally formed on its top innermost side, which mate with one or more respective channels on the right panel. The use of separate top tabs 24 helps to more securely engage the left panel 12 with the right panel 14 during assembly of the chassis 11, to prevent the respective panels (together with any components attached thereto) from sliding around. Using a tab 24 mated to a slot also helps to provide a smooth seam, without buckling, along this portion of the chassis 11. Other integral techniques for mating the top of the left panel 12 to the right panel 14, such as interlocking teeth, hooks, detents, and the like are, of course, usable in accordance with the invention. Also, as those skilled in the art will appreciate, the top tab 24 of the left panel 12 could instead be part of the right panel 14, with the slot to which the top tab 24 mates being located on the top side of the left panel 12.

A PCB hook 26 is integrally formed into the front and left sides of the left panel 12 to hold in place a first PCB 28. The geometry of the PCB hook 26 and number of PCB hooks required is defined by the nature (e.g., the thickness and size) of the first PCB 28 that the PCB hook 16 is designed to accept. In the embodiment of FIG. 2A, additional PCB hooks 26 (see FIG. 3) are used to securely attach the first PCB 28.

Although the illustrated left panel 12 has a substantially "L" shaped appearance, the left panel 12 could be formed in a shape other than an "L" shape. For example, the left panel 12 could be integral with the rear panel 18, thus having a substantially "U" shaped appearance. With a left panel 12 having a "U" shaped configuration and integral rear panel 18, the left panel 12 and right panel 14 could be joined using a single fastener (not shown). The left panel 12 furthermore could be integral with the rear panel 18 and also have a central panel (not shown), projecting in the same direction as the front side of the left panel 12, having a substantially "E" shaped appearance, the central panel helping to form a compartment or tunnel in the chassis 11. Other variations will occur to those skilled in the art.

The right panel 14 includes a front lip 30 for attaching the top, right, and bottom front edges of the right panel 14 to the left panel 12. The top front and right front portions of the front lip 30 fit into recesses formed integrally into the inside front of the left panel 12; this attachment is illustrated in greater detail herein. The bottom front portion of the front lip 30 mates with a channel (see FIG. 4) formed integrally into the bottom of the inside front of left panel 12 (see FIG. 4). A rear lip 32 is formed along the right rear side of the right panel 14 and fits into a recess formed integrally into the inside of the rear panel 18.

Integrally formed into the underside of the top of the right panel 14 is at least one rear latch (see FIGS. 2B, 3A, and 3B) sized to engage a respective rear hook 36 formed along the back top side of the rear panel 18. In one embodiment, the right panel 14 has a plurality of rear latches, each disposed to receive a respective rear hook 26. In another embodiment (not shown), the right panel 14 includes at least one rear latch and the left panel 12 includes at least one rear latch, such that the rear hooks 36 can engage both the left panel 12 and the right panel 14. A rear hook 36 permits the rear panel 18 to be attached to the right panel 14 and left panel 12 by engaging the rear hook 36 while pivoting the rear panel 18 downward into the latch and then pivoting the rear panel 18 shut over the rear lip 32 of the rear panel 18 and over a left rear portion (see FIG. 3B) of the left panel 12. Thus, the rear panel 18 can capture the outside of the left panel 12 and the right panel 14 to keep them together.

Ventilation openings 38 can be integrally formed into the right panel 14, to provide cooling to one or more of the components contained within the chassis 11. One skilled in the art will appreciate that the quantity and location of the ventilation openings 38 is determined by the type, quantity, and location of components contained within the chassis. The ventilation openings 38 could, of course, be formed in one or more of the other panels of the chassis, instead of or in addition to the ventilation openings 38 formed into the right panel. Generally, the ventilation openings 38 are located in a place on the chassis 11 capable of intaking ventilating air during use.

It should be understood that although the embodiment of FIG. 2A shows the left panel 12 forming a right side and a front side, with the right panel 14 forming the top side, most of the bottom side, and the left side, it is of course possible to create the chassis 11 in a "mirror image" configuration, with the left panel 14 forming the left side and the front, the right panel 12 forming the right, top and part of the bottom side, etc.

FIG. 2A also illustrates the battery door 16 as viewed from the underside. In the chassis of FIG. 2A, the battery door 16 is located at the bottom of the chassis 11, to make the backup battery (not shown) easily accessible to the user. The battery door 16 mates with an opening formed into the right panel 14 via battery tabs 42 integrally formed with the battery door 16 and locks into place via a battery locking tab 40 integrally formed with the battery door 16. When the battery door 16 is fully engaged and locked into the right panel 14, it completes the bottom side of the chassis 11. FIGS. 4A through 4C and FIGS. 9A through 9C provides greater detail about the design of the battery door 16 and the positioning of a battery.

A related co-pending and commonly assigned application filed on Jan. 30, 2001 and having Ser. No. 09/772,747 (the disclosure of which is hereby incorporated by reference) describes a type of battery wire connection mechanism usable with the battery compartment of the chassis 11 of the present invention. The disclosed battery wire connection mechanism, in combination with the chassis 11 and battery door 16, permits easy user installation of battery(ies) and very simple replacement of the battery(ies) without using tools. This co-pending application also further illustrates the type and appearance of batteries usable in accordance with the present invention.

Figure 2B:
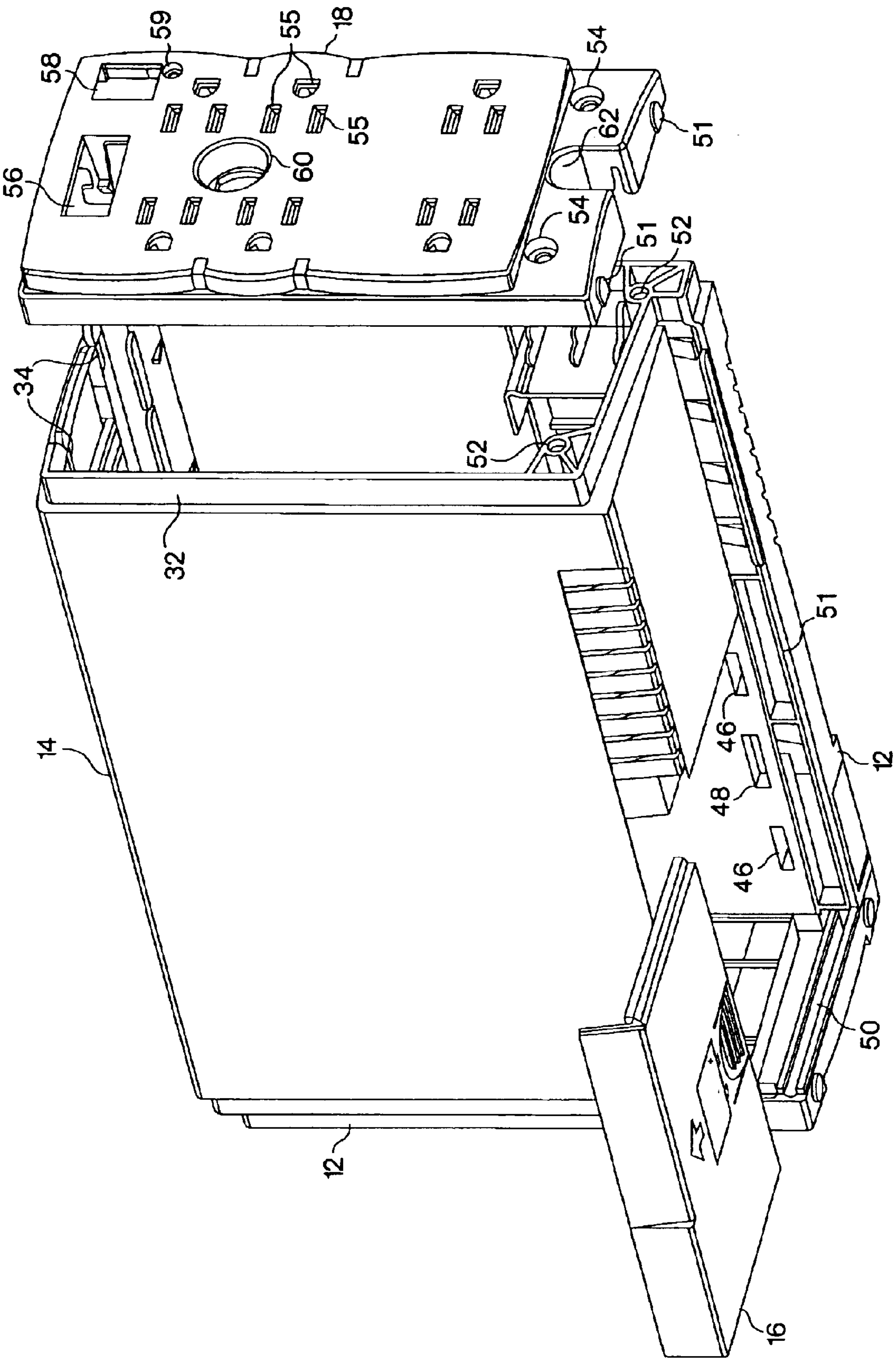

FIG. 2B is a partially exploded rear perspective view of the chassis of FIG. 2A. Formed integrally into the right panel 14 are a pair of battery slots 46 that mate with the battery tabs 42 (FIG. 2A), along with a locking slot 48 that engages the locking tab 40 (FIG. 2A) of the battery door 16. A pair of rear latches 34 is integrally formed into the underside of the top side of the right panel 14 to engage the rear hooks 36 (FIG. 2A). Visible on the bottom inside front side of the left panel 12 is a front channel 50 for receiving the bottom of the front lip 30 of the right panel 14. A pair of rear feet 51 is integrally formed into the bottom of the rear panel 18, to support the chassis 11 during use.

The bottom rear sides of the left panel 12 and right panel 14 each includes a respective bore 52 integrally formed into the respective panel and adapted to receive a respective fastening element, such as a screw, inserted into a respective fastener opening 54 integrally formed in the rear panel 18. In the disclosed embodiment, just two screws are required to hold together the left panel 12, right panel 13, and rear panel 18, into a secure, substantially rigid chassis 11. This manner of holding together the three panels adds structural integrity to the chassis 11 and simplifies assembly by requiring just two fastening elements. It should be understood, however, that the rear panel 18 could be attached to the left panel 12 and right panel 14 using other fastening techniques, such as snaps, welds, adhesives, and the like, such that no external fastening elements would be required at all.

Referring again to FIG. 2B, the rear panel 18 has at least one integrated outlet receptacle 55 permitting a device to be protected by the UPS components (not shown) housed within the chassis 11 to be operably coupled to the UPS. In another embodiment, a plurality of integrated outlet receptacles 55 are provided whereby some of the integrated outlet receptacles 55 can be used for battery backup and some of the integrated outlet receptacles 55 can be used for surge protection.

The rear panel 18 includes an optional integrated telephone/modem opening 56 sized to receive telephone/modem connectors (see FIG. 7), an optional integrated data opening 58 sized to receive a data port (not shown), an integrated surge protection opening 59 for receiving a surge protection indicator, an integrated circuit breaker opening 60 sized to receive a user-resettable circuit breaker, and an integrated line cord opening 62 for receiving a line cord assembly (see FIGS. 13–16). The outlet receptacle(s) 55 are, in one embodiment arranged in a so-called BLOCKSAFE configuration (BLOCKSAFE is a trademark of American Power Corporation of West Kingston, R.I.). The BLOCKSAFE configuration spaces outlet receptacles such that plugs attached to large charging devices, such as those used with mobile phones, can be connected to a given outlet receptacle 55 without blocking over the other available outlet receptacles 55.

Although not illustrated in FIG. 2B, the rear panel 18 also can have integrally molded accommodation for other features such as site wiring fault indicators, functional labeling, identification, signaling jacks, and the like. It should be understood that the illustrated openings, labels, and receptacles of the rear panel 18 are provided by way of example only. Those skilled in the art will recognize that other designs for the rear panel 18 can omit any or all or the recited openings and further can add additional integral features not described here, but well within the knowledge of those skilled in the art. Moreover, as described in connection with FIGS. 17A through 17J, the design of the rear panel 18 could be altered to vary the receptacle type depending on the particular type of receptacle used in a particular region of the world. Note that any of the different rear panel designs in FIGS. 17A through 17J are interchangeable with the rear panel 18 of FIG. 2B and can be coupled directly to the left panel 12 and right panel 14 without alteration to either the left panel 12 or the right panel 14.

Figure 3A:
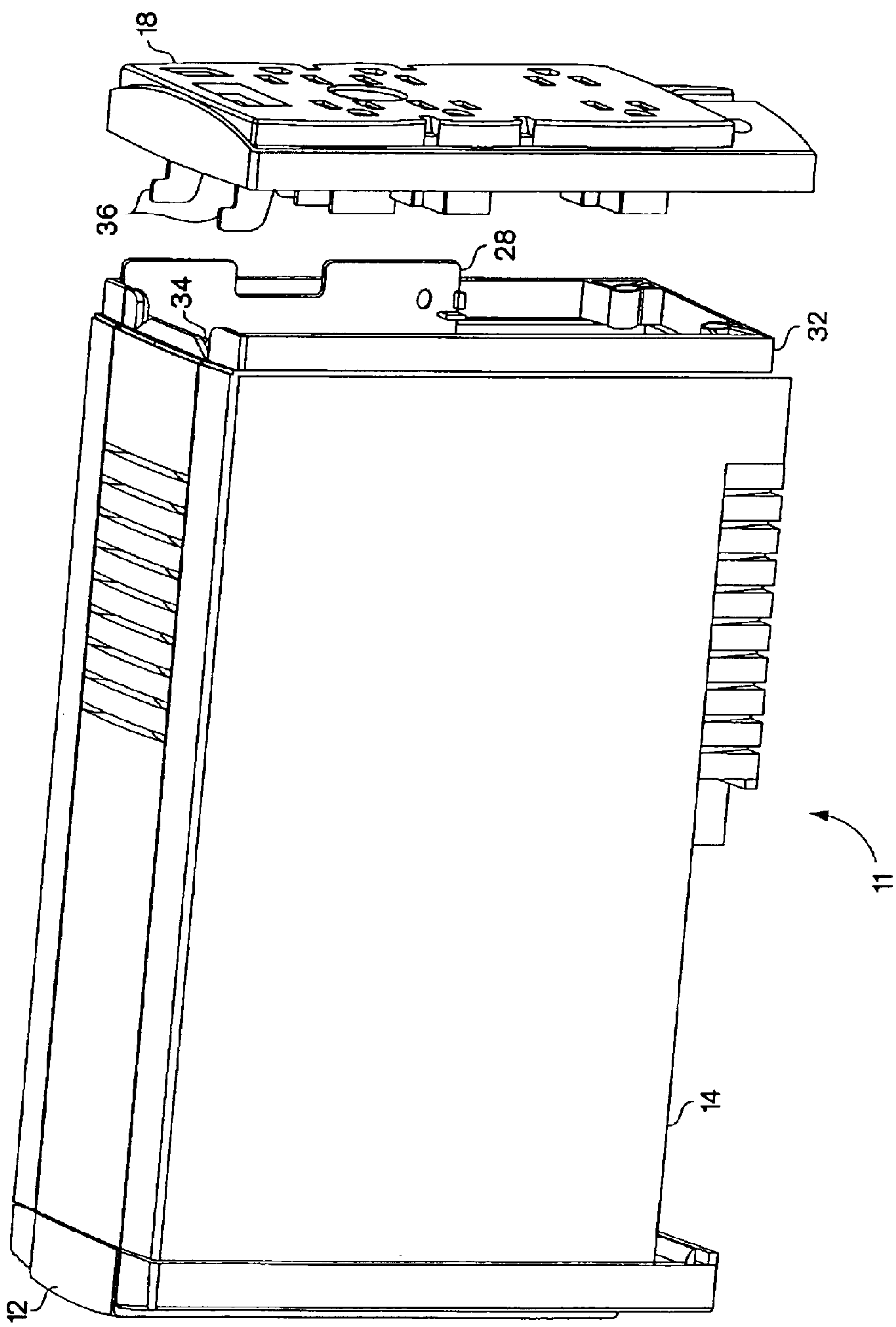
FIGS. 3A and 3B are partially exploded perspective views showing the assembly of the rear panel to the right and left panels, as viewed from the right and left sides, respectively, for the chassis of FIGS. 2A–2B.
Figure 3B:
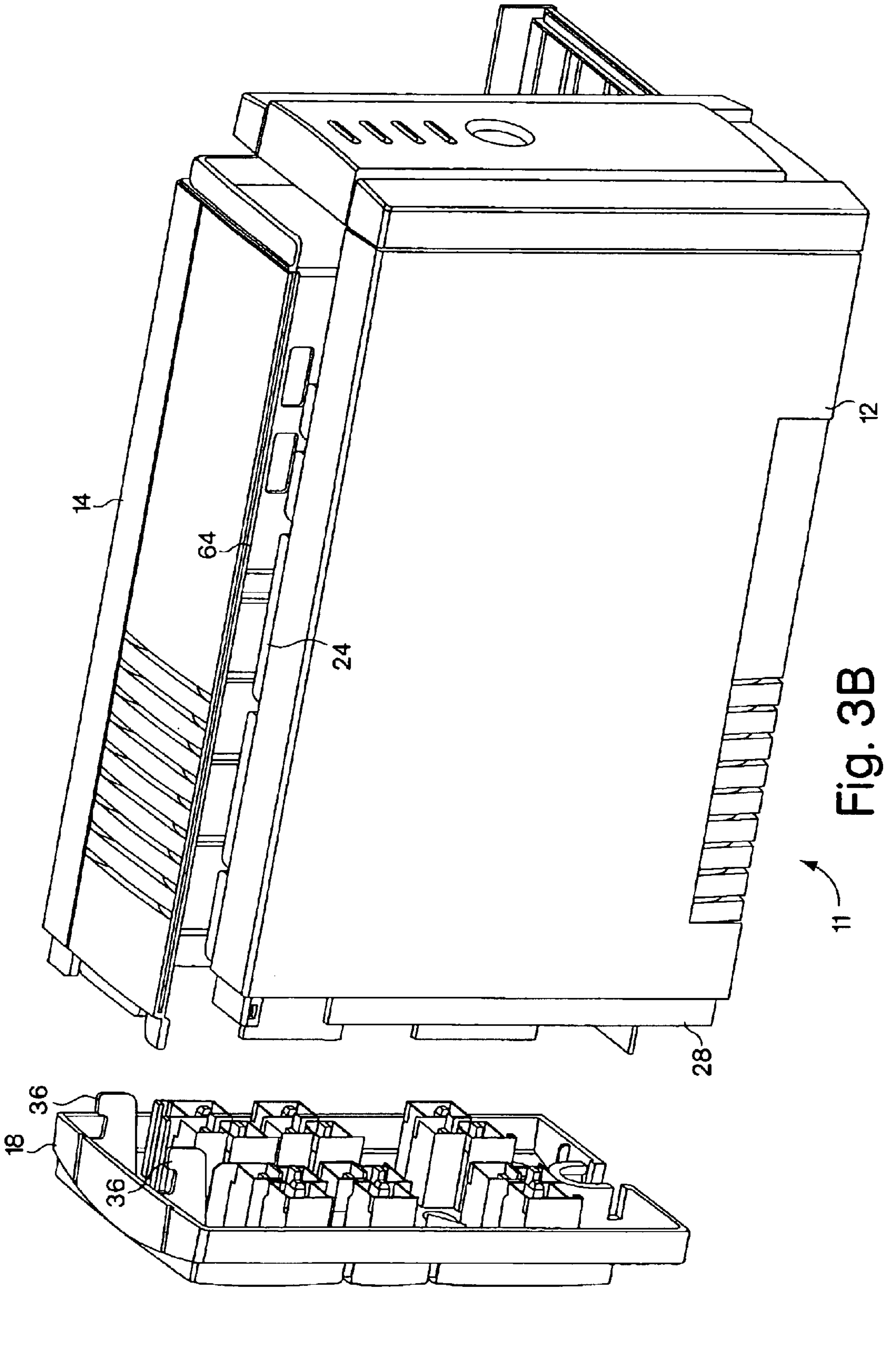

FIGS. 3A and 3B are partially exploded perspective views showing the assembly of the rear panel 18 to the right panel 14 and left panel 12, as viewed from the right and left sides, respectively, for the chassis 11 of FIG. 2A. FIGS. 3A and 3B illustrate more particularly the manner in which a rear hook 36 is aligned with and engaged to a rear latch 34. In addition, FIG. 3B illustrates a top right slot 64 to which one or more of the top tabs 24 mate.

Figure 4A:
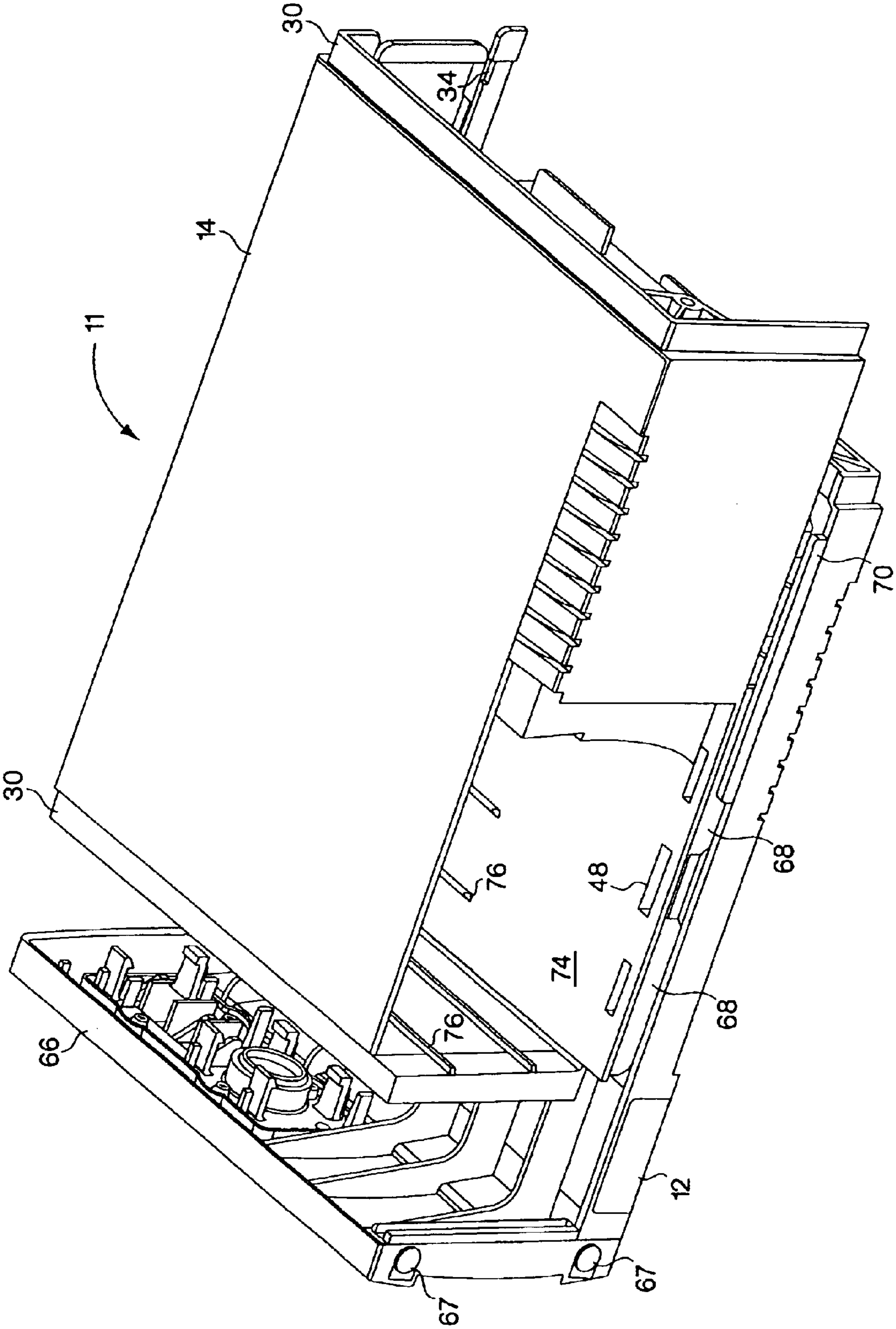
FIG. 4A is a partially exploded perspective view showing the assembly of the right panel to the left panel, along with the battery compartment as viewed from the bottom, for the chassis of FIGS. 2A–2B, and FIGS. 4B–4C are perspective views showing the positioning and movement of a battery within the battery compartment of the chassis of FIGS. 2A–2B.

FIG. 4A is a partially exploded perspective view showing the assembly of the right panel 14 to the left panel 12 as viewed from the bottom, for the chassis 11 of FIG. 2A. As shown in FIG. 4, at the front of the chassis 11, the front lip 30 of the right panel 14 engages under a left panel lip 66 formed along the right edge of the front panel portion of the right panel 12. A pair of front feet 67 is integrally formed into the bottom front of the left panel 12 to provide support to the chassis 11 during use. In addition, FIG. 4A illustrates more particularly the location of a rear latch 34 that engages the rear hook 36 (FIG. 2A).

At the bottom front right side of the right panel 14, a first junction tab 68 integrally formed into the right panel 14 mates to a first junction slot 78 (see FIG. 5) formed integrally into the bottom left edge of the left panel 12. In one embodiment, there are a plurality of first junction tabs 68 arranged to provide spacing to permit the locking tab 40 (FIG. 2A) of the battery door 16 (FIG. 2A) to engage the locking slot 48. In addition, the left panel 12 has a second junction tab 70 integrally formed along the rear of its bottom left edge. The second junction tab 70 mates with a second junction slot 64 (see FIG. 10) formed integrally into the bottom left edge of the right panel 14.

The first and second junction tabs 68, 70, together with their respective junction slots, help to form a tight, stable seam between the bottom left edges of the left panel 12 and the right panel 14 and help to prevent movement and buckling of the panels during assembly of the unit and after assembly of the chassis 11 is complete. Providing some junction tabs on the left panel 12 and some junction tabs on the right panel 14 increases the rigidity of the seam between the left panel 12 and right panel 14.

The battery compartment 74 of the right panel 14 is integrally formed into the right panel 14. The location of the battery compartment 74 is chosen so that it is sufficiently distant from signals and components that could be harmful to a user accessing the battery compartment 74, such as high-voltage electronic components, components such as transformers that can have relatively high surface temperatures, etc. The size of the battery compartment 74 depends on the size of the battery 71 (see FIGS. 4B–4C) to be installed. The walls of the battery compartment 74 include at least one rib 76 to enhance the strength of the walls and help to prevent movement of a battery 71 disposed within the battery compartment 74.

Figure 1:
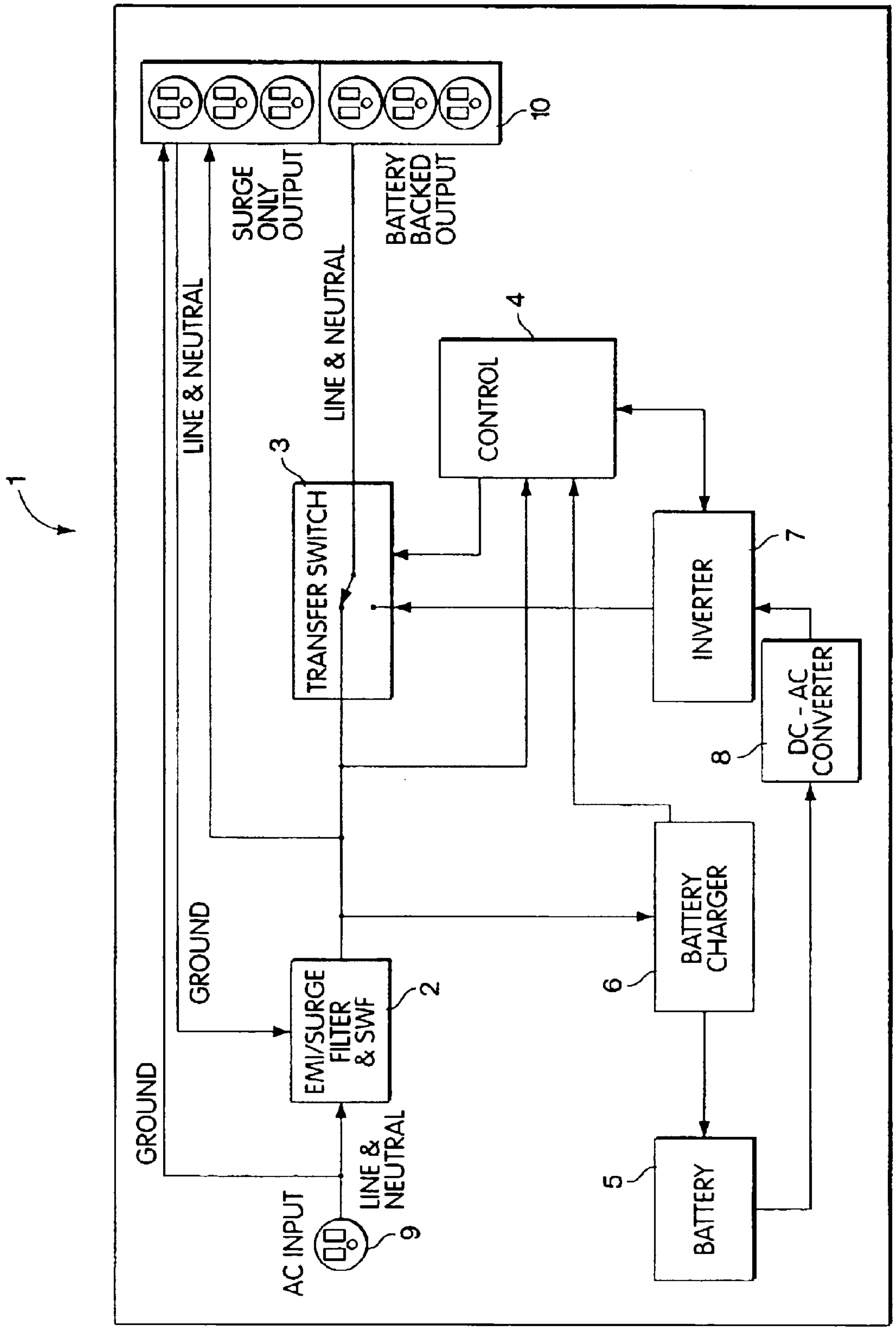
FIG. 1 is a block diagram of a typical uninterruptible power supply.
Figure 4B:
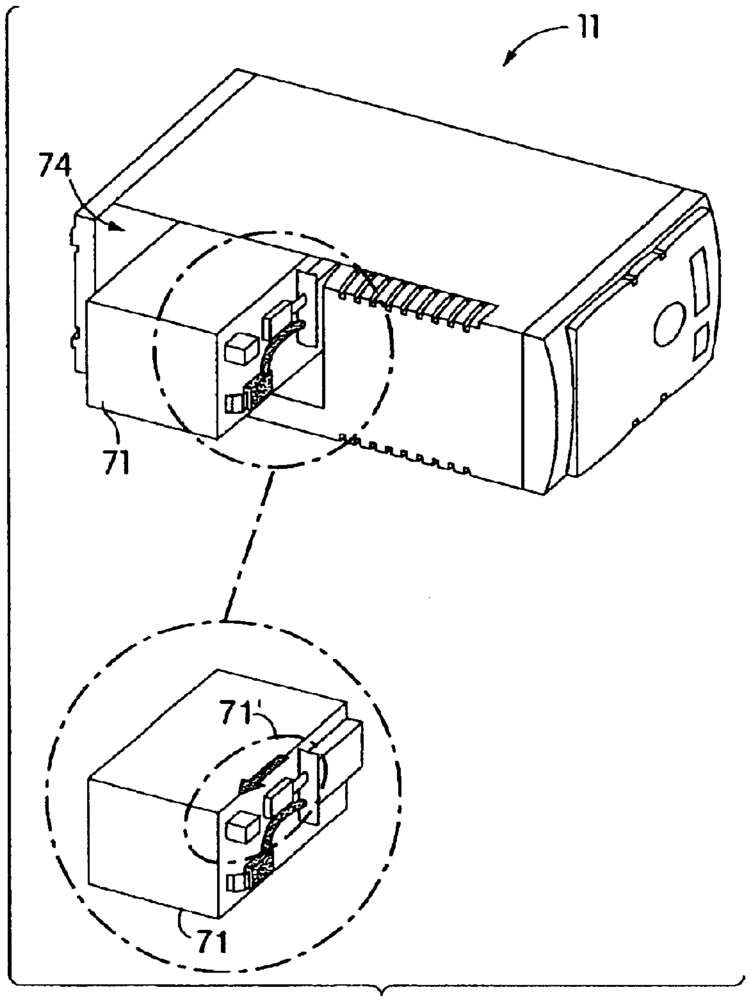
Figure 4C:
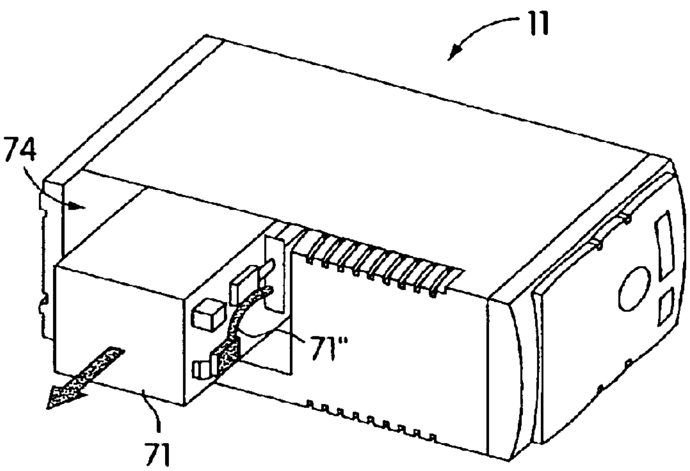

FIG. 4B is a perspective view showing the positioning of a battery 71 within the battery compartment 74 of the chassis 11. The battery 71 is a representative example of the type, size, and style of a battery 71 usable with the UPS (and chassis) of the present invention. The highlighted portion 71' of the battery 71 shows the part of the battery 71 that is engaged, such as by a user, to remove the battery 71 from the battery compartment 74 or to install the battery 71 into the battery compartment 74. FIG. 4C is another perspective view showing the direction of movement of the battery 71 within the battery compartment 74. FIG. 4C also illustrates a battery wire connection 71" operably coupling the battery 71 to the other UPS electronic components (such as those shown in FIG. 1). The battery 71 and the details of its battery wire connections to the UPS are described more fully in the copending application entitled "Battery Wire Lead Management," having Ser. No. 09/772,747, filed Jan. 30, 2001, and referenced previously (the disclosure of which is hereby incorporated by reference).

Figure 5:
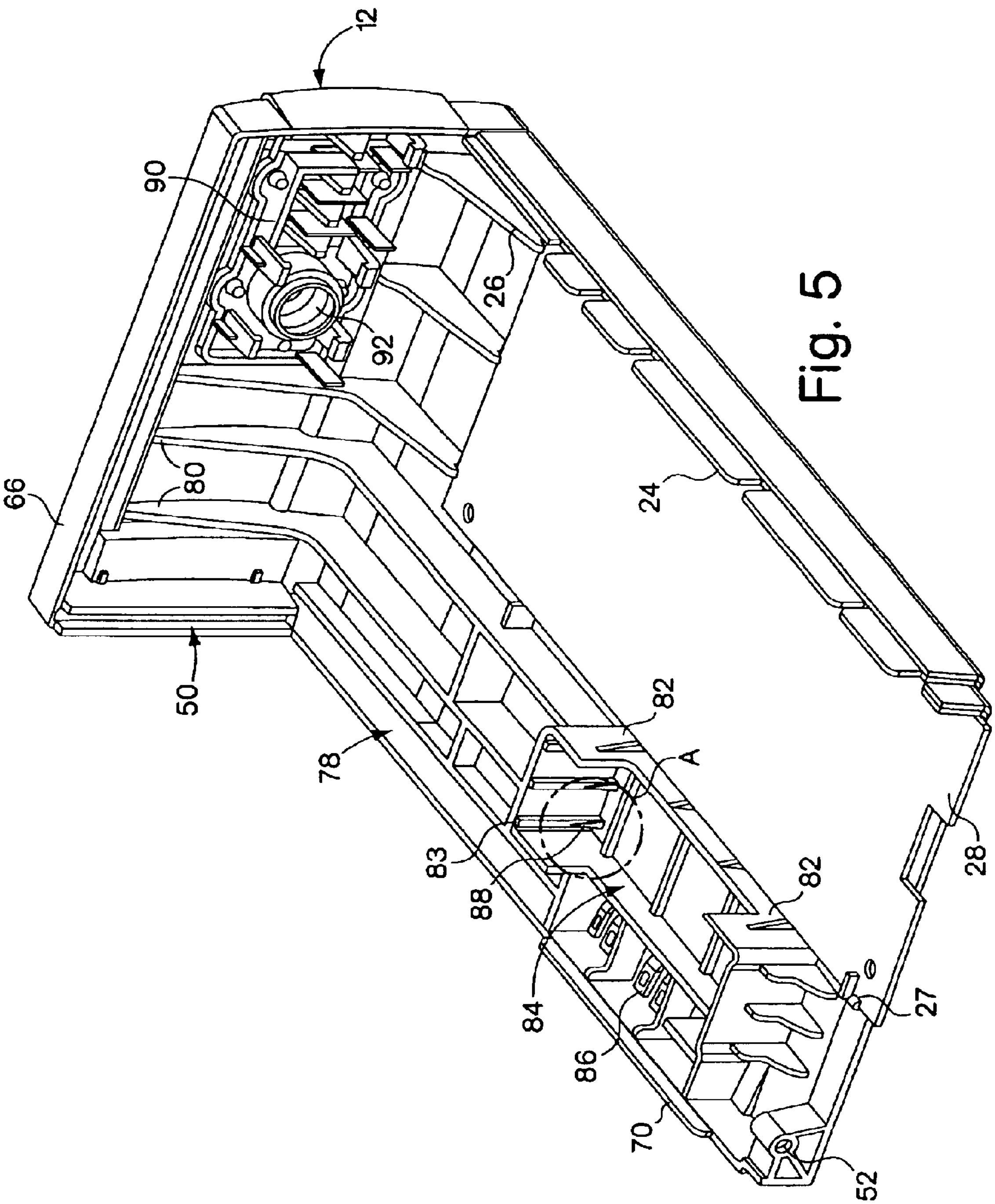
FIG. 5 is a perspective view of the rear side of the left panel of the chassis of FIGS. 2A–2B, illustrating some of the components attached to the left panel.

FIG. 5 is a perspective view of the rear side of the left panel 12 of the chassis 11 of FIG. 2A, illustrating some of the features of and components attached to the left panel 12. In this view, the left panel 12 is lying on its left side and is being viewed from its top left rear corner. Formed along the bottom left edge of the left panel 12 is a first junction slot 78 that engages the first junction tab 68 (FIG. 4A). The first PCB 28 is held in place using one or more PCB hooks 26 integrally formed into the left panel 12. The PCB hooks 26 have a tapered edge to permit the first PCB 28 to be aligned properly. In addition, a first PCB snap 27 also can be integrally formed into the left panel 12 and disposed opposite to the PCB hook 26, to secure an opposite end of the first PCB 28.

The left panel 12 includes one or more left panel support members 80 integrally formed into the walls of the left panel 12. Providing such left panel support members 80 provides strength and stiffness to the left panel and permits manufacture of the left panel 12 using thinner walls (and, thus, less chassis material). Using less material decreases the overall weight of the chassis 11 and decreases its cost.

Integrally formed left transformer support members 82 form a left transformer enclosure 84 into which a flat surface of a UPS Transformer (see FIG. 7) is fitted. The left transformer enclosure 84 is sized to accommodate the weight and dimensions of a given UPS transformer, and cooperates with a substantially similar right transformer enclosure (see FIG. 10) on the right panel 14, to hold the transformer of the UPS securely in place. Disposed along the left transformer support member 82 are one or more left transformer support ribs 83 to hold a transformer securely into place. In the illustrated embodiment, the left transformer support ribs 83 are provided along only one end of the left transformer enclosure 84 to enable the transformer to be installed more easily.

Figure 6:
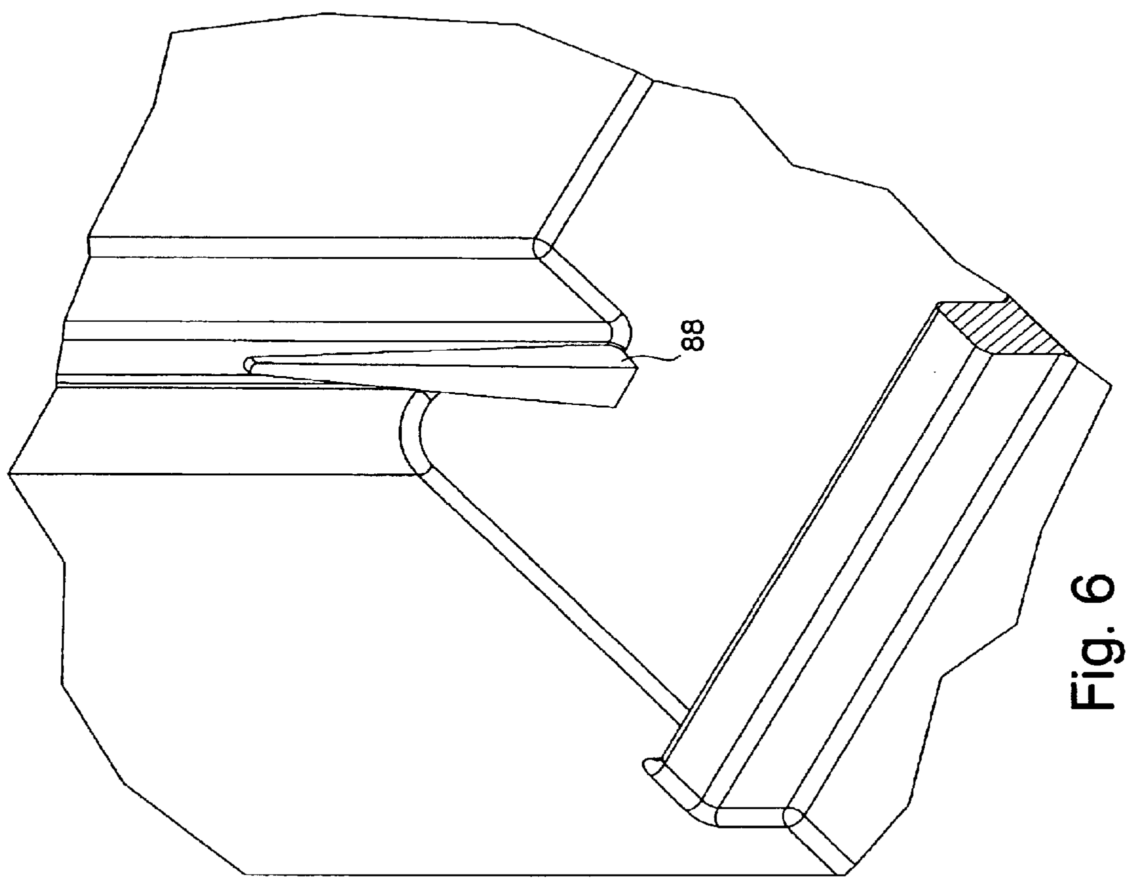
FIG. 6 is an enlarged view of the region labeled "A" in FIG. 5.

In one embodiment, at least one of the left transformer support ribs 83 further includes a left crush rib 88. The structure and design of a left crush rib 88 in accordance with the invention is further illustrated in FIG. 6, which provides an enlarged view of the region labeled "A" in FIG. 5. One function of the left crush rib 88 is to compensate for excess tolerance between the size of the transformer and the size of the left transformer enclosure 84. Another function of the left crush rib 88 is to help to eliminate audible rattling of the transformer during use. This is accomplished by the crush rib 88 actually "crushing" or compressing during use, such that the amount of "crush" or compression is proportional to the amount of excess tolerance between the transformer and the transformer enclosure 84. The left crush rib 88 can be implemented in many ways. For example, as shown in FIG. 5, it is integrally molded to the left panel 12, as part of the left transformer support rib 83. The left crush rib 88 also can be implemented using mechanisms other than crush ribs that compensate for tolerance gaps, such as integral plastic fingers, a loop of material, a spring, a spacer, a bumper, a foam pad, and the like.

One or more left transformer vents 86 can be provided adjacent to the left transformer enclosure 84, such that, during use, the left transformer vents provide a natural cross-flow of air to provide convection cooling.

During manufacture of a molded left panel 12, the dimensions of the left transformer enclosure 84 can be modified to accommodate a differently sized transformer (for example, different sizes and types of transformers might be required for the UPS to work properly in different regions of the world). For example, if the left panel 12 is created using injection molding, the transformer enclosure 84 can be modified simply by swapping a particular portion of the mold (not shown) used to make the left panel 12. Those skilled in the art will recognize other techniques for changing the dimensions and features of the left transformer enclosure 84.

Another feature of the left panel 12 is the light pipe 90. The light pipe 90 comprises a light pipe retainer structure that houses a switch button (not shown in FIG. 5) and that is operably coupled to a second PCB (see FIG. 2A) that holds light emitting diodes (LED's) and a switch. The light pipe 90 provides a mechanism for directing light from the LED's to the indicator openings 20 (FIG. 2A) on the front panel portion of the left panel 12. The light pipe can be made of any type of material capable of transmitting light from an LED. In one embodiment, the lightpipe 90 is made of a clear polymer materials (e.g., polycarbonic, acrylic). It also is possible to construct a light pipe 90 using translucent polymer materials, glass, and the like. In one embodiment, the light-pipe is heat staked to the left panel 12. However, the light pipe 90 can be attached to the left panel 12 by any technique known to those skilled in the art, such as welding, adhesives, integral clips formed into the left panel 12, etc., that holds the light pipe 90 in proper alignment with the indicator openings 20. FIGS. 8A through 8D illustrate the design and features of the light pipe 90 in greater detail.

Figure 7:
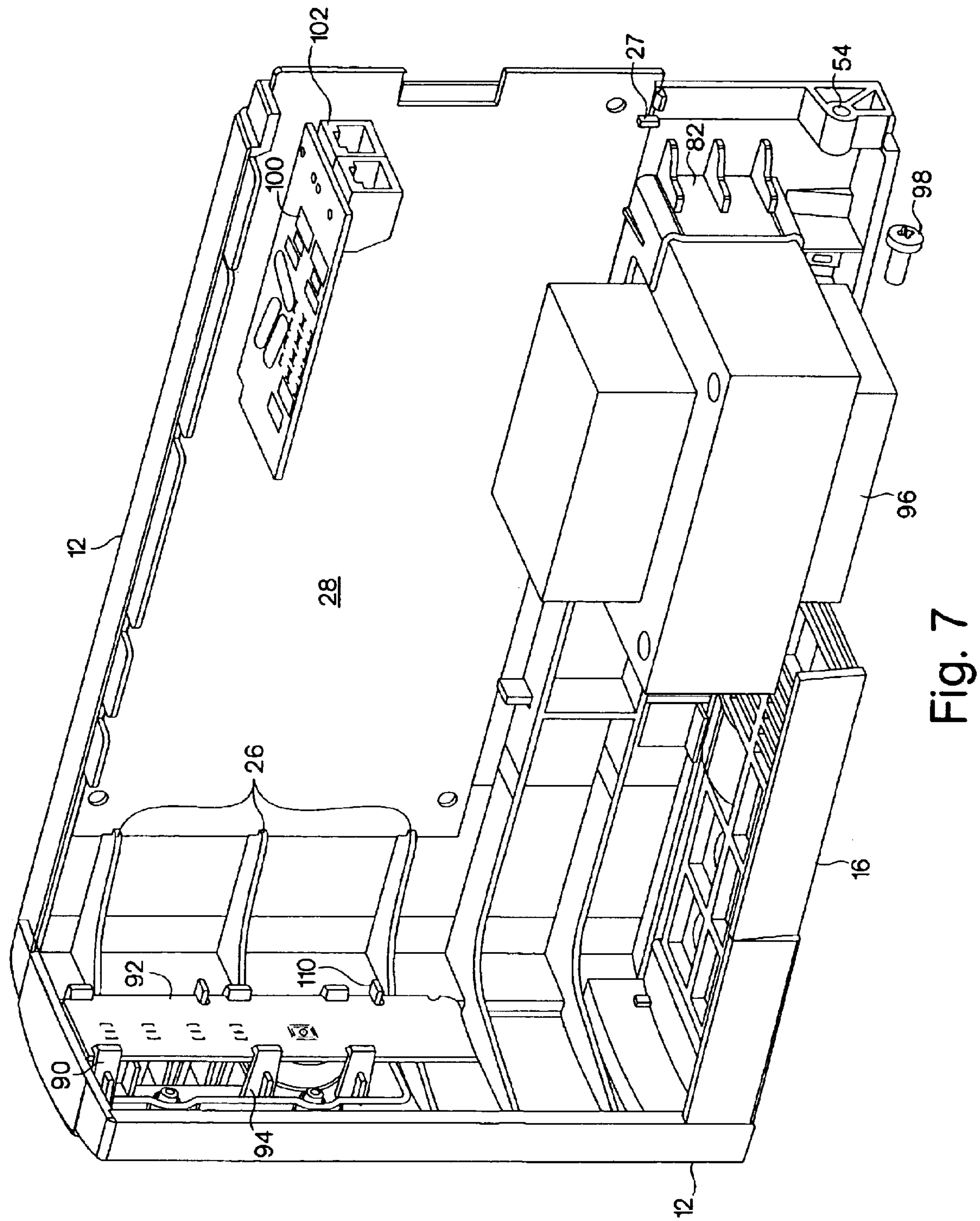
FIG. 7 is another perspective view of the rear side of the left panel of FIG. 5, illustrating the transformer position.

FIG. 7 is another perspective view of the rear side of the left panel 12 and battery door 16 of the chassis 11 of FIG. 2A, illustrating the construction of the left panel 12 in more detail along with some of the components attached and/or adjacent to the left panel 12. As discussed previously, one or more PCB hooks 26 are integrally formed on the inside of the left panel 12 to hold a first PCB 28 in place. Typically, the first PCB 28 will include one or more electronic elements arranged on the board, but these elements have been omitted in the drawing for the sake of clarity.

FIG. 7 also shows the second PCB 92 of the light pipe 90, illustrating how a plurality of light pipe clips 94 help to hold the second PCB 92 in place. A transformer 96, such as the type of transformer used in a typical UPS, is illustrated as partially enclosed within the left transformer enclosure 84. In one embodiment, the core of the transformer 96 can be welded, such as by argon welding, to eliminate bolted style construction and allow for smoother installation and quieter operation.

A screw 98, which is but one type of fastening element usable with the invention, also is illustrated in the respective position it would be when installed into the bore 54 on the right panel 14 (a bore on the left panel 12 also is illustrated).

Figure 12:
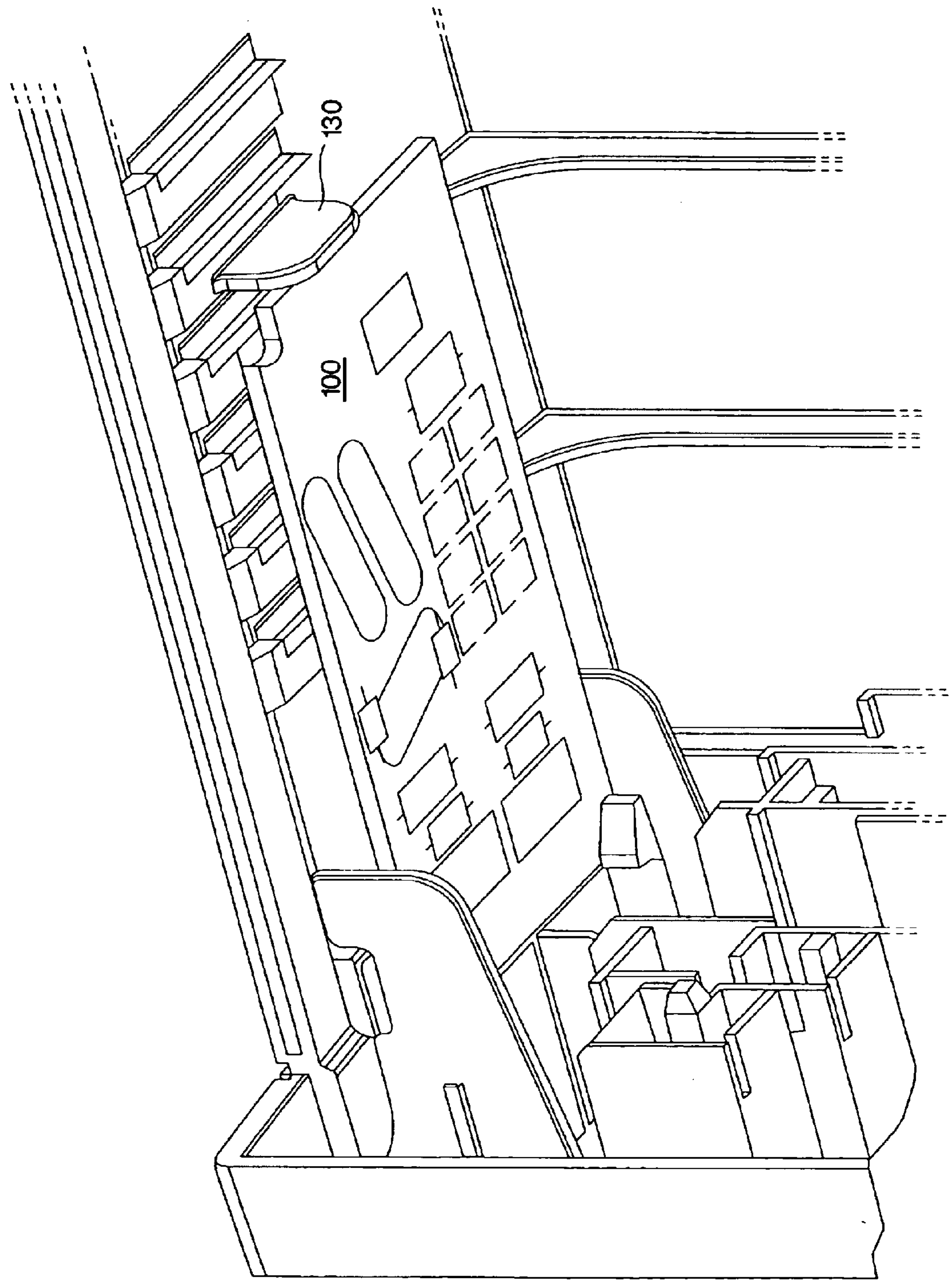
FIG. 12 is an enlarged perspective view of a portion of the right panel of the chassis of FIGS. 2A–2B.

Adjacent to the left panel 12, and normally held in place by the rear panel 18 (not shown is a telephone surge PCB 100 coupled to telephone jacks 102. The telephone surge PCB 100 can be part of the UPS and can snap into the rear panel 18, as shown in FIG. 12

FIGS. 8A, 8B, 8C, and 8D are enlarged front perspective, side, rear perspective, and rear views, respectively of the lightpipe 90 of FIG. 5. Referring to FIGS. 8A through 8D, at least one light transmitting member 104 is formed integral with the light pipe 90 and is provided to permit the light from an LED on the second PCB 92 (FIG. 7) to be transmitted to the front side of the left panel 12, so that a user can view the indicator. The light transmitting member 104 can be angled as shown, to help transmit the light emitted by an LED on the second PCB 92 to the front panel portion of the left panel 12. Light pipe clips 94 are integrally formed with the light pipe to hold the second PCB 92 in position. At least one attachment opening 106 is provided so that the light pipe 90 can be attached, such as by spot welding, to the left panel 12.

Each light transmitting member 104 is associated with at least one respective shade tab 108 integrally formed into the light pipe 90. The shade tab 108 helps to ensure the light transmitting member 104 only transmits light associated with its respective LED on the second PCB 92 and helps prevent the light transmitting member 104 from transmitting light (and thus appearing to be illuminated) that actually is associated with the LED of a different indicator.

The light pipe 90 also includes a key 110 mating to a respective opening or notch on the second PCB 92 (see also FIG. 7). The key 110 helps the light pipe 90 to mate properly with the second PCB 92, so that each light transmitting member 104 will be properly aligned to its respective LED on the second PCB 92.

Figure 9A:
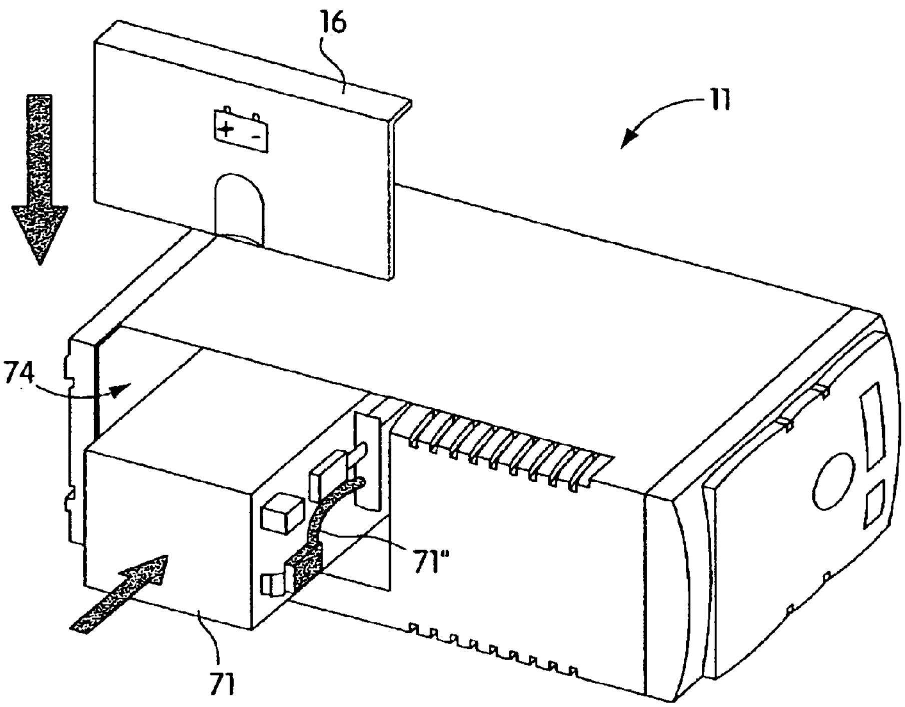
FIGS. 9A through 9C are a rear perspective views of the closing and opening of the battery door and of the battery door structure, respectively, for the chassis of FIGS. 2A–2B.
Figure 9B:
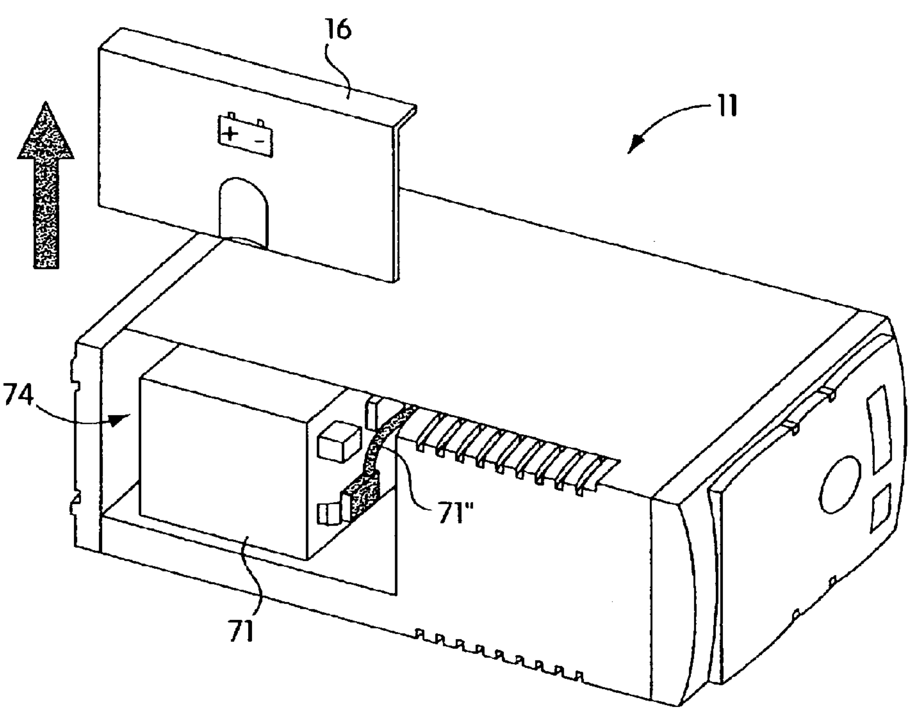
Figure 9C:
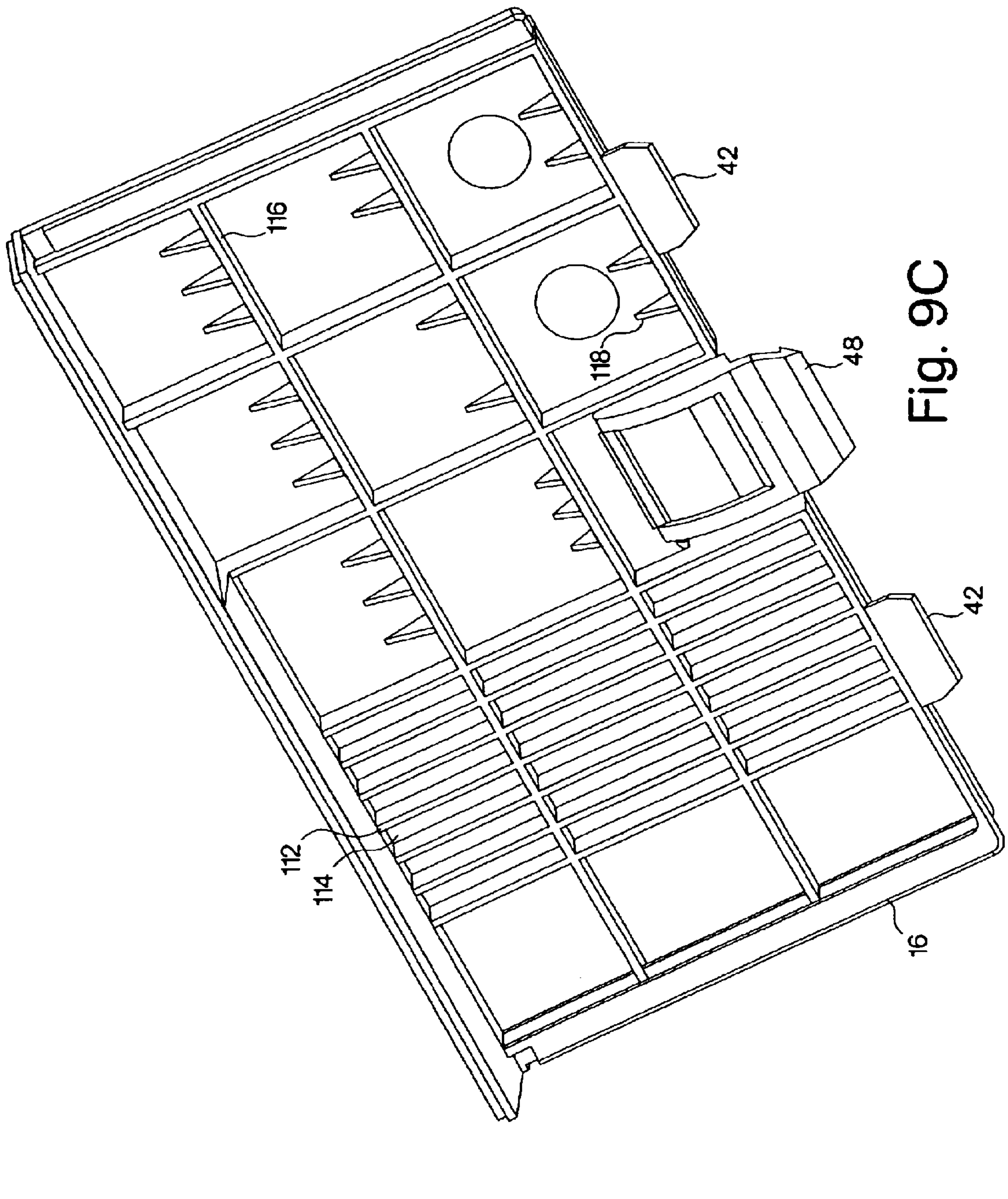

FIGS. 9A through 9C are a rear perspective views of the closing and opening of the battery door and of the battery door structure, respectively, for the chassis of FIGS. 2A–2B. FIG. 9A illustrates the direction of movement for installing the battery 71 and then sliding the battery door 16 towards the left side of the chassis 11 (the left side is not visible in FIG. 9A) to close the battery door 16 over the battery compartment 74. FIG. 9B is a perspective view of the chassis 11 illustrating the battery 71 in an installed position and showing the direction of movement in which the battery door 16 is moved to remove it and gain access to the installed battery 71 (or to otherwise gain access to the battery compartment 74).

FIG. 9C shows an enlarged rear perspective view of the battery door of the chassis 11 of FIG. 2A. The battery door 16 is sized to support the weight and dimensions of a UPS battery 71 (FIGS. 9A–9B) and is located on the chassis 11 to meet height and width restrictions imposed on the chassis 11 by the components contained therein. The battery door 16 includes a plurality of door ribs 112 integrally formed to the battery door 16 and sized to define one or more battery channels 114 that have widths smaller than the diameter of battery wires 71" (see FIGS. 4C and 9A–9B). The sizing of the door ribs 112 helps to prevent the UPS battery wires 71" from catching on or tangling with the battery door 16 when the battery door is moved. The battery door 16 also comprises a plurality of integrally formed battery ribs 116 providing strength and rigidity to the battery door 16, and optionally can include a plurality of ramp ribs 118 disposed on the battery door 16 so as to align with a label (not shown) attached to the battery. The ramp ribs 118 help to prevent the battery door 16 from catching on or damaging the battery label.

Figure 10:
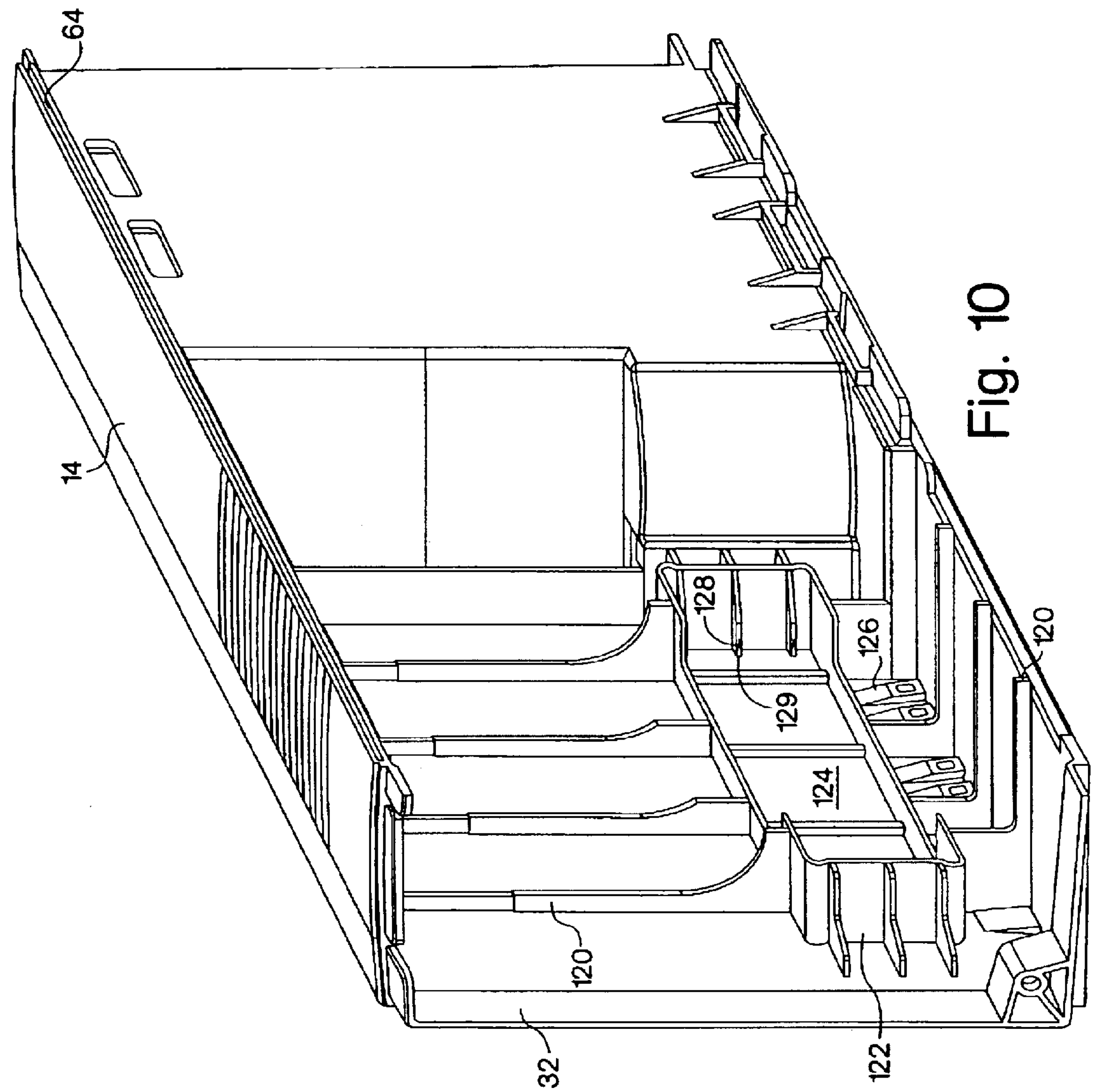
FIG. 10 is a right front perspective view of the right panel of the chassis of FIGS. 2A–2B, as viewed from the top.

FIG. 10 is a right front perspective view of the right panel 14 of the chassis 11 of FIG. 2A, as viewed from the top. The right panel 14 provides a mounting structure for the UPS transformer that is substantially similar to that described in connection with the left panel 12, including right panel support members 120 integrally formed into the walls of the right panel 14, integrally formed right transformer support members 122 forming a right transformer enclosure 124 into which a flat surface of a UPS Transformer (see FIG. 7) is fitted, one or more right transformer support ribs 128, at least one right crush rib 129, and one or more right transformer vents 126. These features are substantially the same as their "mirror image" features on the left panel 12 and their description and features are not repeated here.

Figure 11:
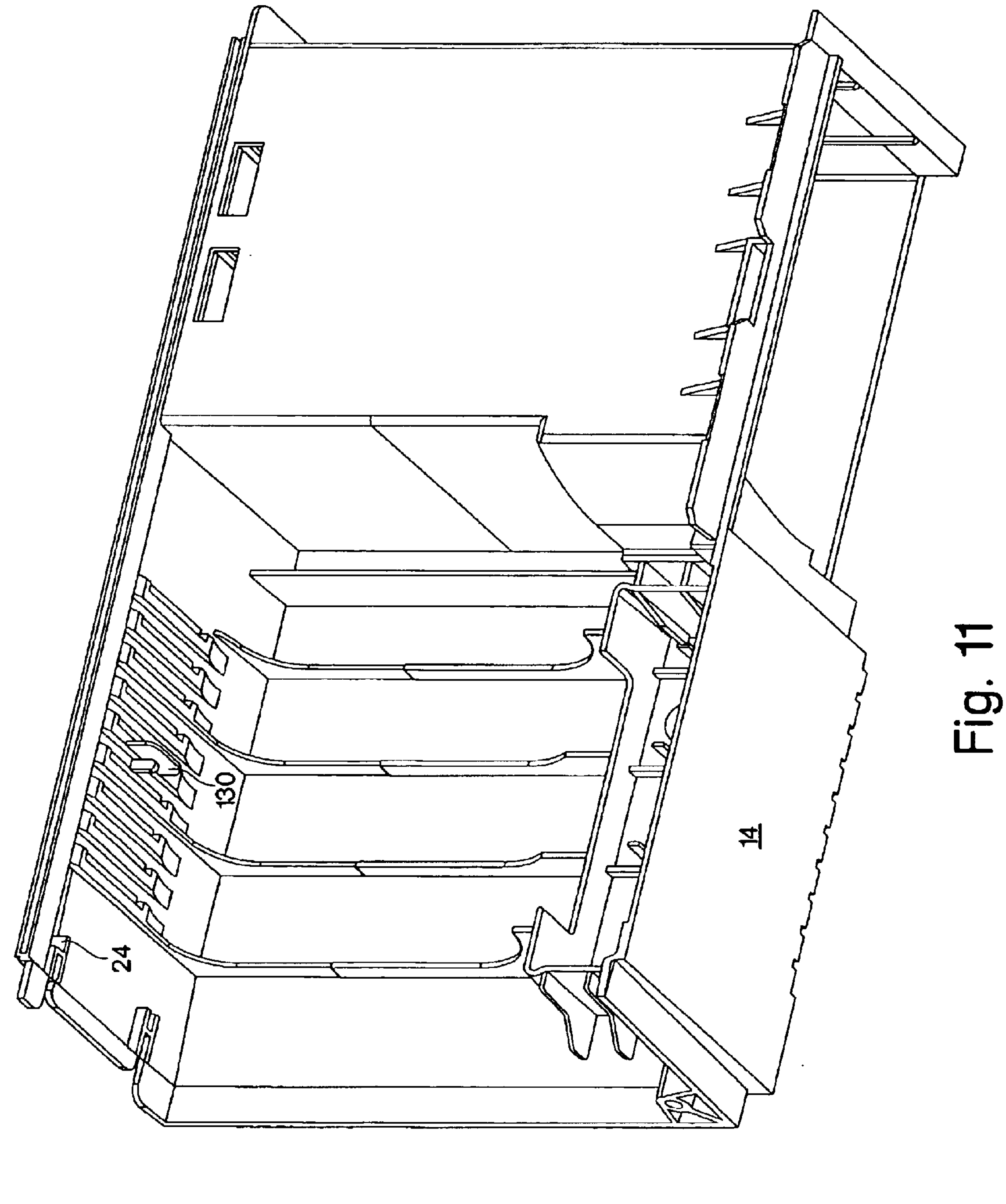
FIG. 11 is a right front perspective view of the right panel of the chassis of FIGS. 2A–2B, as viewed from the bottom.

FIG. 11 is a right front perspective view of the right panel 14 of the chassis of FIG. 2A, as viewed from the bottom. This view shows a positive stop 130 integrally formed into the inside top rear surface of the right panel 14. This positive stop 130 is provided to contact a PCB, such as the telephone surge PCB 100 (see FIG. 7), during assembly, to prevent the PCB from being pushed too far in. The positive stop 130 also can help to prevent vibration and/or movement of the telephone surge PCB 100 attached to the rear panel 18. FIG. 12 is an expanded close up view of the telephone surge PCB 100 in contact with the positive stop 130.

Figure 13:
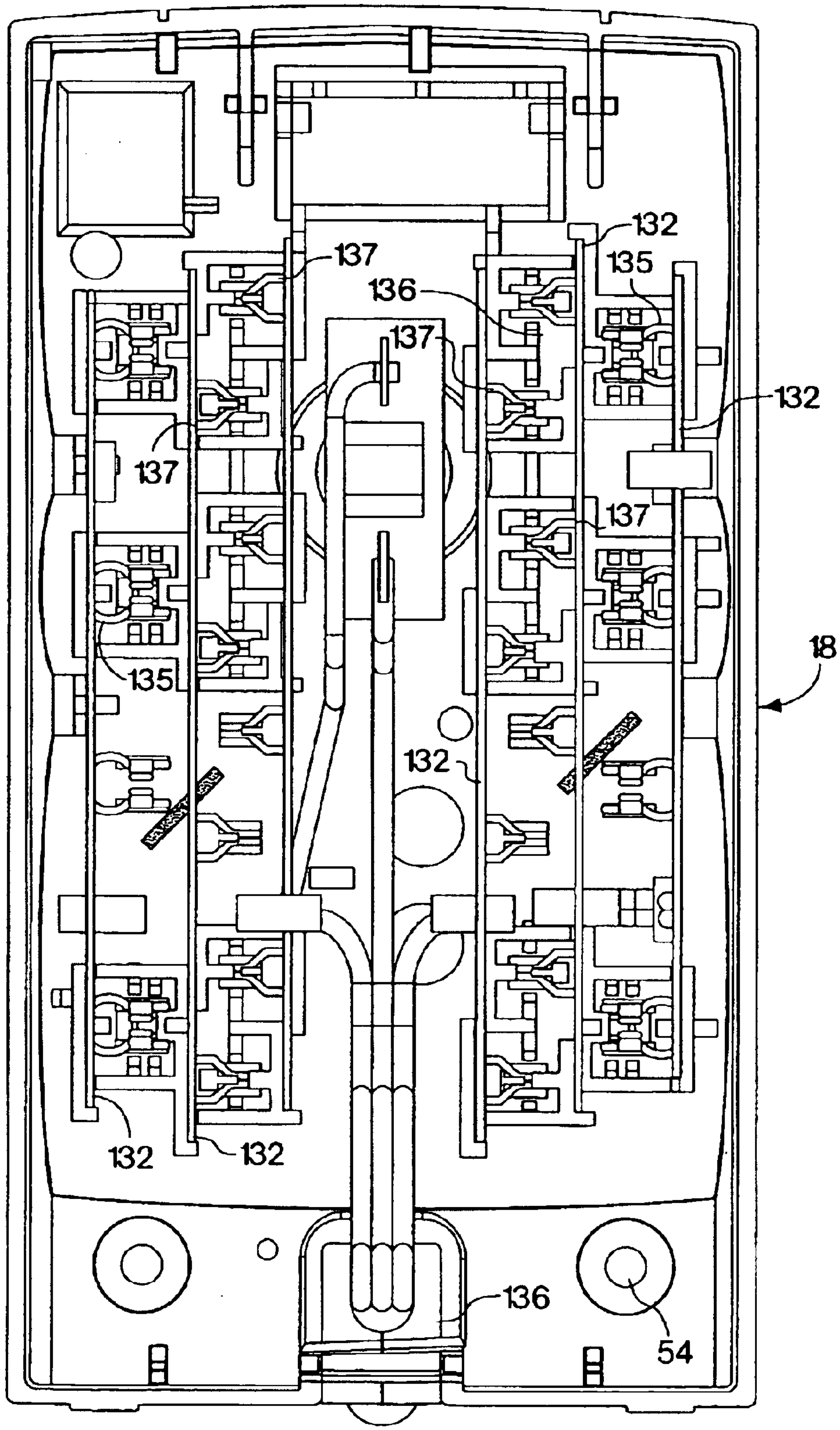
FIG. 13 is a view of the rear side of the rear panel of the chassis of FIGS. 2A–2B, showing some installed components.
Figure 14:
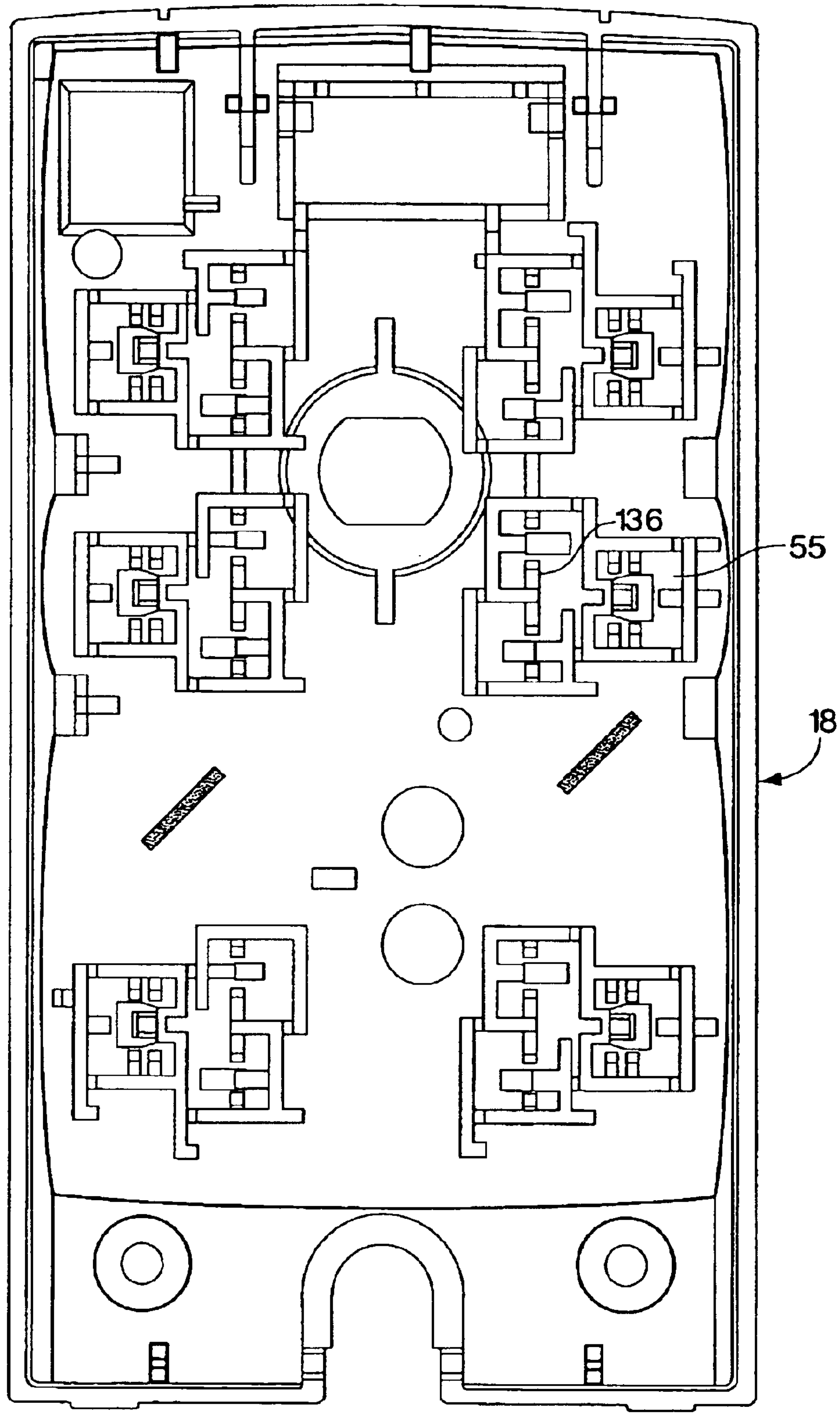
FIG. 14 is a view of the rear side of the rear panel of the chassis of FIGS. 2A–2B, without installed components.

FIG. 13 is a view of the rear side of the rear panel 18 of the chassis of FIG. 2A showing some components installed, and FIG. 14 is the same view without components installed. In FIG. 13, a plurality of bus bars 132 are installed and a line cord assembly 136 also is installed. Referring to FIGS. 13 and 14, the bus bars 132 are held in place by snapping the bus bars 132 into bus bar support members 136 that, in one embodiment, are formed integrally with the rear panel 18 as part of the integral receptacles 55 formed into the rear panel 18. In one embodiment, the integral receptacles 55 are constructed and arranged so that the bus bars 132 can snap in and be retained without additional fasteners or retainers.

In addition, in one embodiment, the bus bars 132 are laid out such that only two different types of discrete bus bar parts are required to form all six outlets, to reduce manufacturing cost and simplify assembly. Specifically, a bus bar 132 having ground connectors 135 is used in two positions (the outermost bus bar positions on the left and right sides, respectively, in FIG. 14), and the bus bars 132 having line neutral connectors 137 are arranged facing each other in the remaining four bus bar positions, as illustrated in FIG. 13. This embodiment could be used, for example, in the United States.

The illustrated arrangement of the bus bars 132 to the rear panel 18 can, of course, be changed if the UPS is manufactured or used in a country or region having an alternate type of electrical receptacle and/or voltage (see FIGS. 17A through 17J). In those examples, the rear panel 18 could have receptacles 55 integrally formed into the rear panel, as shown in FIGS. 13 and 14, but which, together with the bus bars 132, are constructed and arranged to mate to the types of plugs used.

Figure 15:
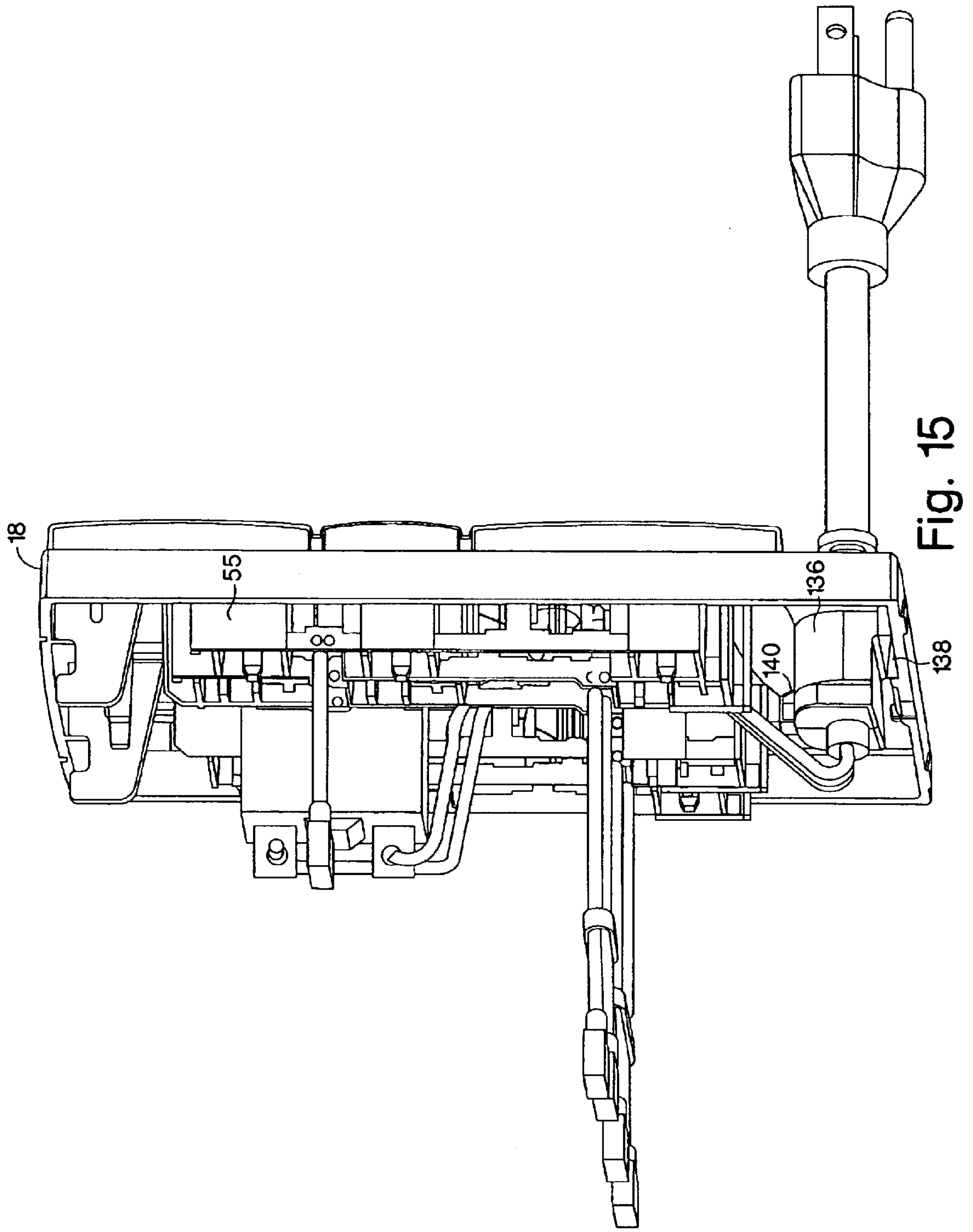
FIG. 15 is a left perspective view of the rear panel of the chassis of FIGS. 2A–2B, taken from the rear side, showing various components installed.
Figure 16:
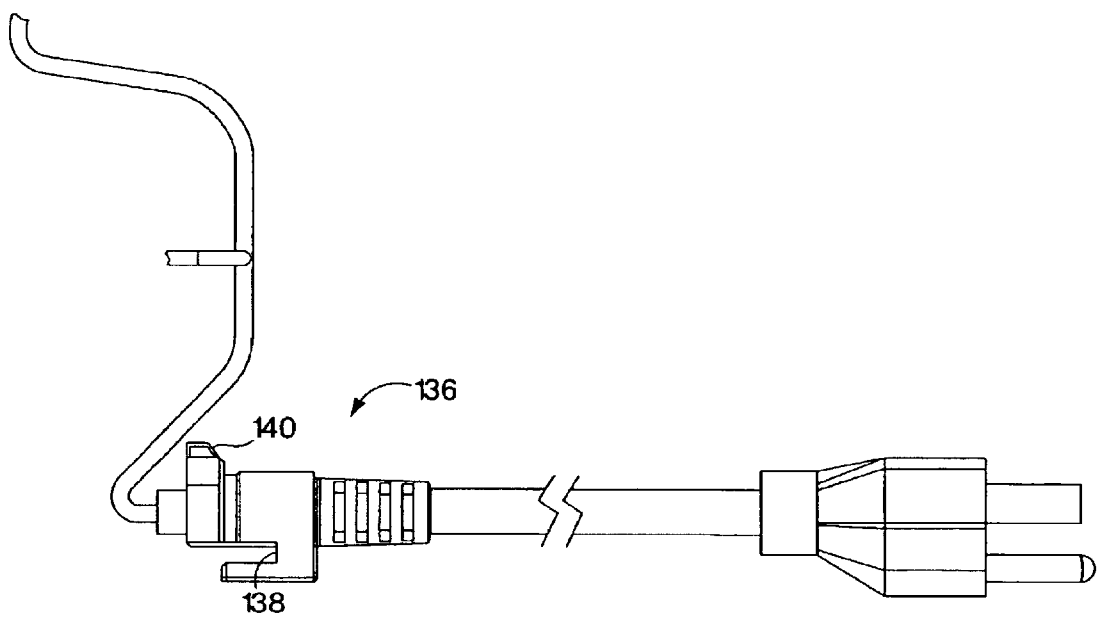
FIG. 16 is a left side view of the line cord assembly.

FIG. 15 is a left perspective view of the rear panel 18 of the chassis 11 of FIG. 2A, taken from the rear side, showing wires, bus bars 132, and the line cord assembly 136 installed. FIG. 16 is a left side view of the line cord assembly 136. Referring to both FIGS. 15 and 16, it can be seen that the line cord assembly 136 includes a strain relief portion 138 integrally molded as part of the line cord assembly 136, to permit the line cord assembly to withstand pulling forces during assembly of the chassis 11 and during use. The strain relief portion 138 engages a portion of the line cord opening 62 integrally formed to the rear panel 18, which portion mates with the contours of the strain relief portion 138. In addition, the line cord assembly 136 includes a detent 140 designed to catch on the line cord opening 62 (FIG. 2), to enable the line cord assembly 136, together with its strain relief portion 138, to stay assembled to the rear panel 18 prior to the rear panel 18's assembly to the left panel 12 and right panel 14.

As those skilled in the art will recognize, the chassis 11 of the present invention can be adapted to work with UPS's having components of varying sizes and weights. The chassis 11 and its associated UPS also can be adapted to work with differing line power systems around the world, simply by swapping internal components (if necessary) and changing the rear panel 18 (including its bus bars 132, if necessary).

Figure 17A:
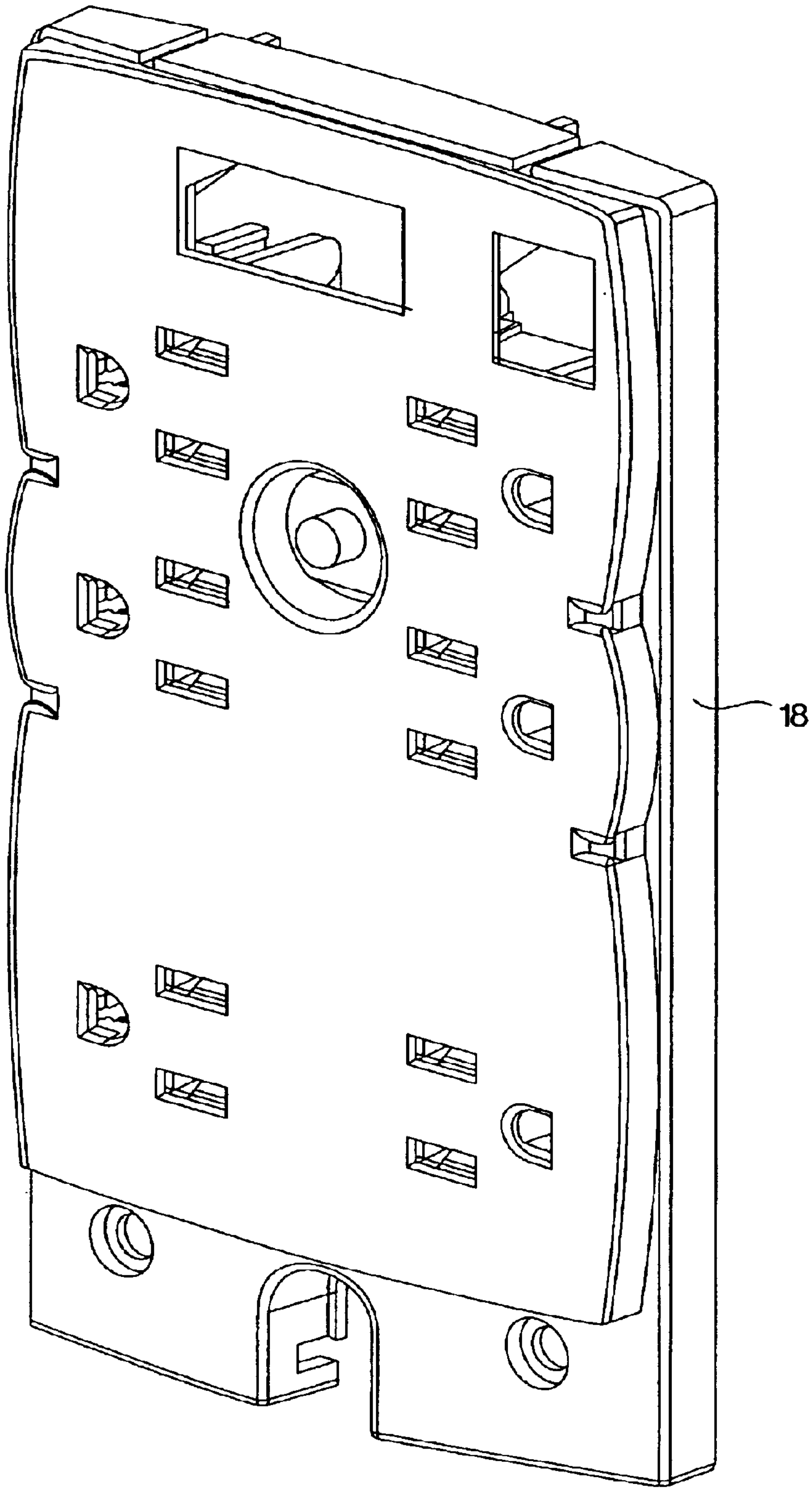
FIGS. 17A through 17J are examples of an alternate rear panel designs.
Figure 17B:
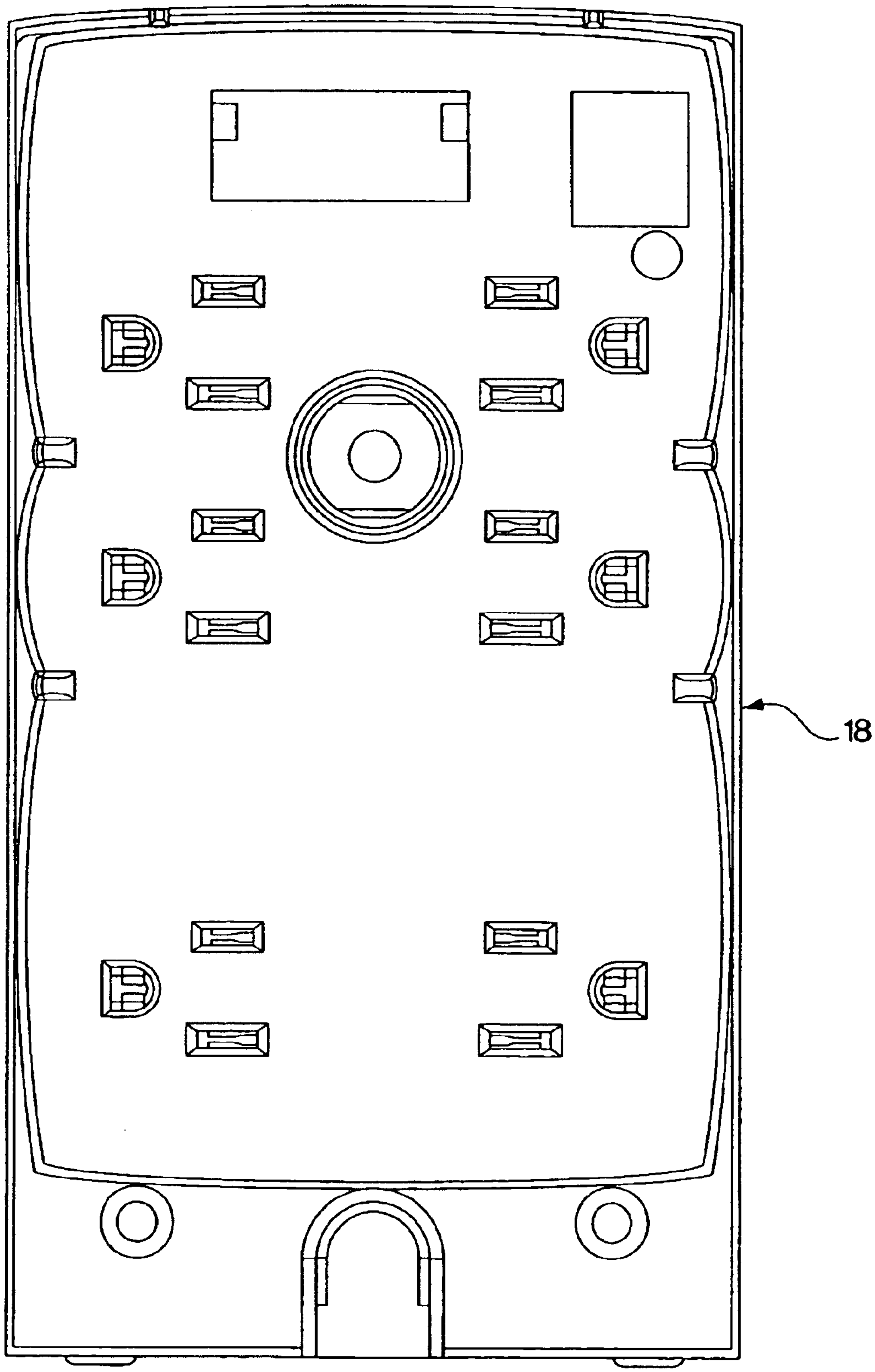
Figure 17C:
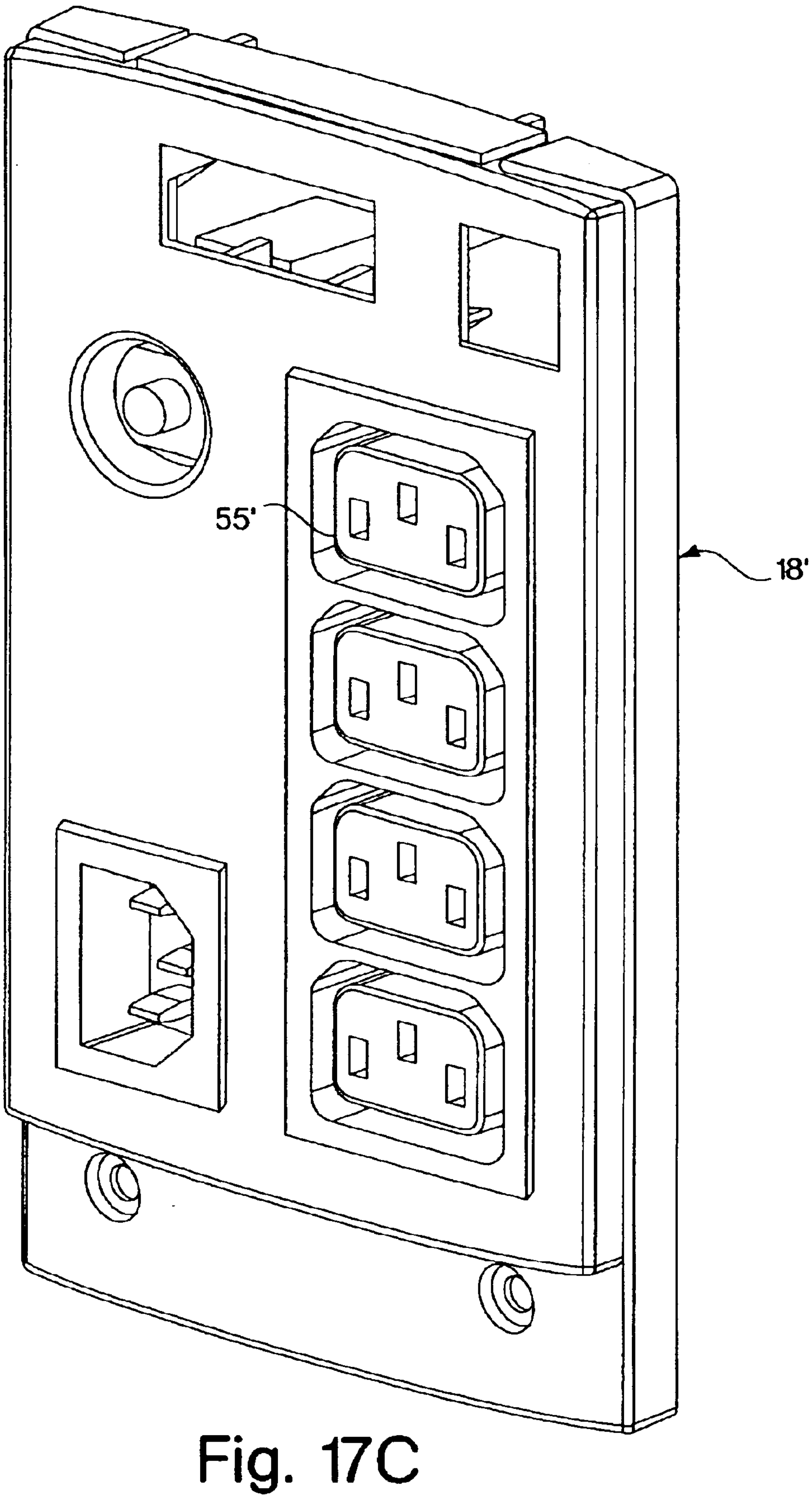
Figure 17D:
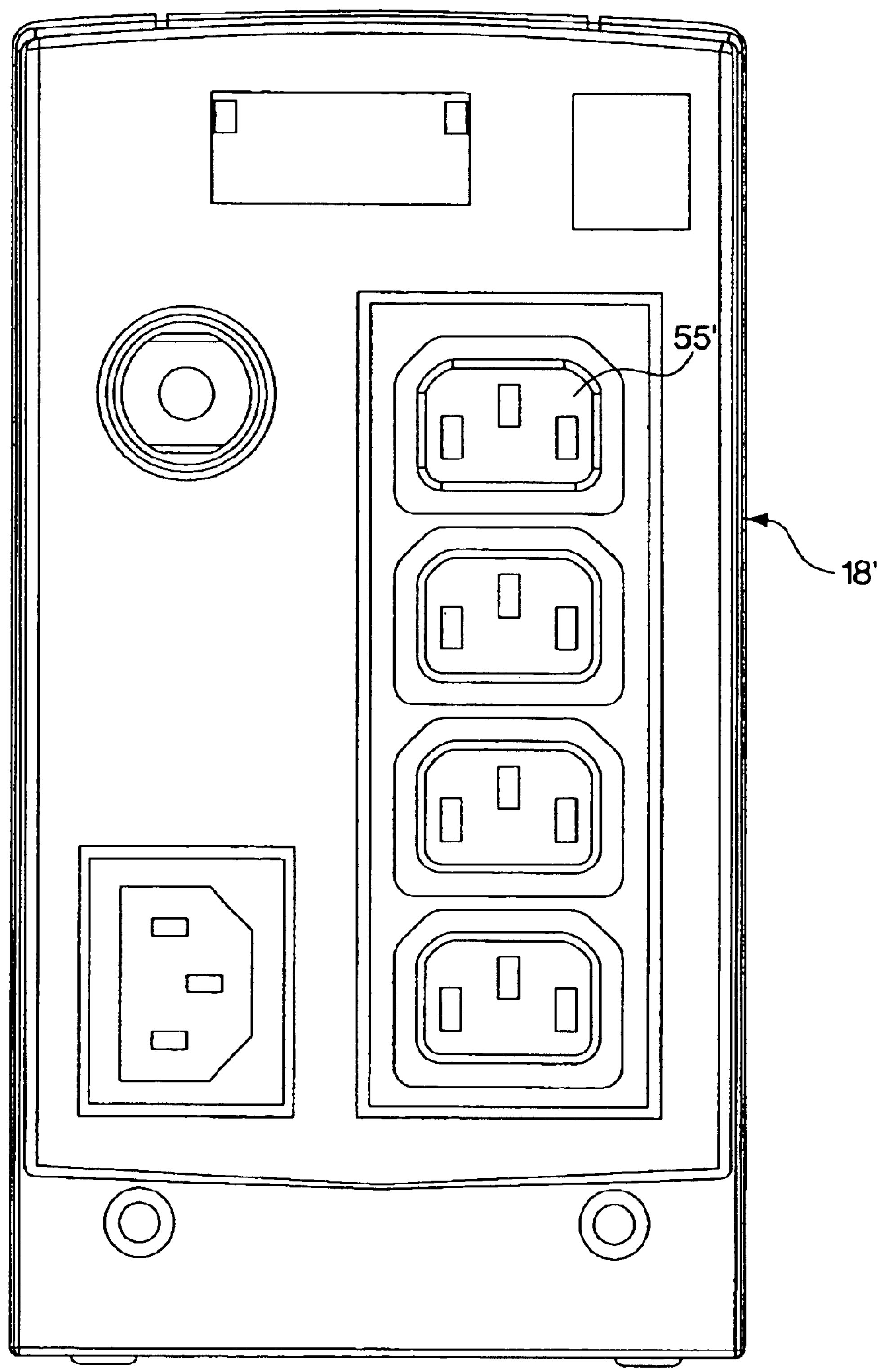
Figure 17E:
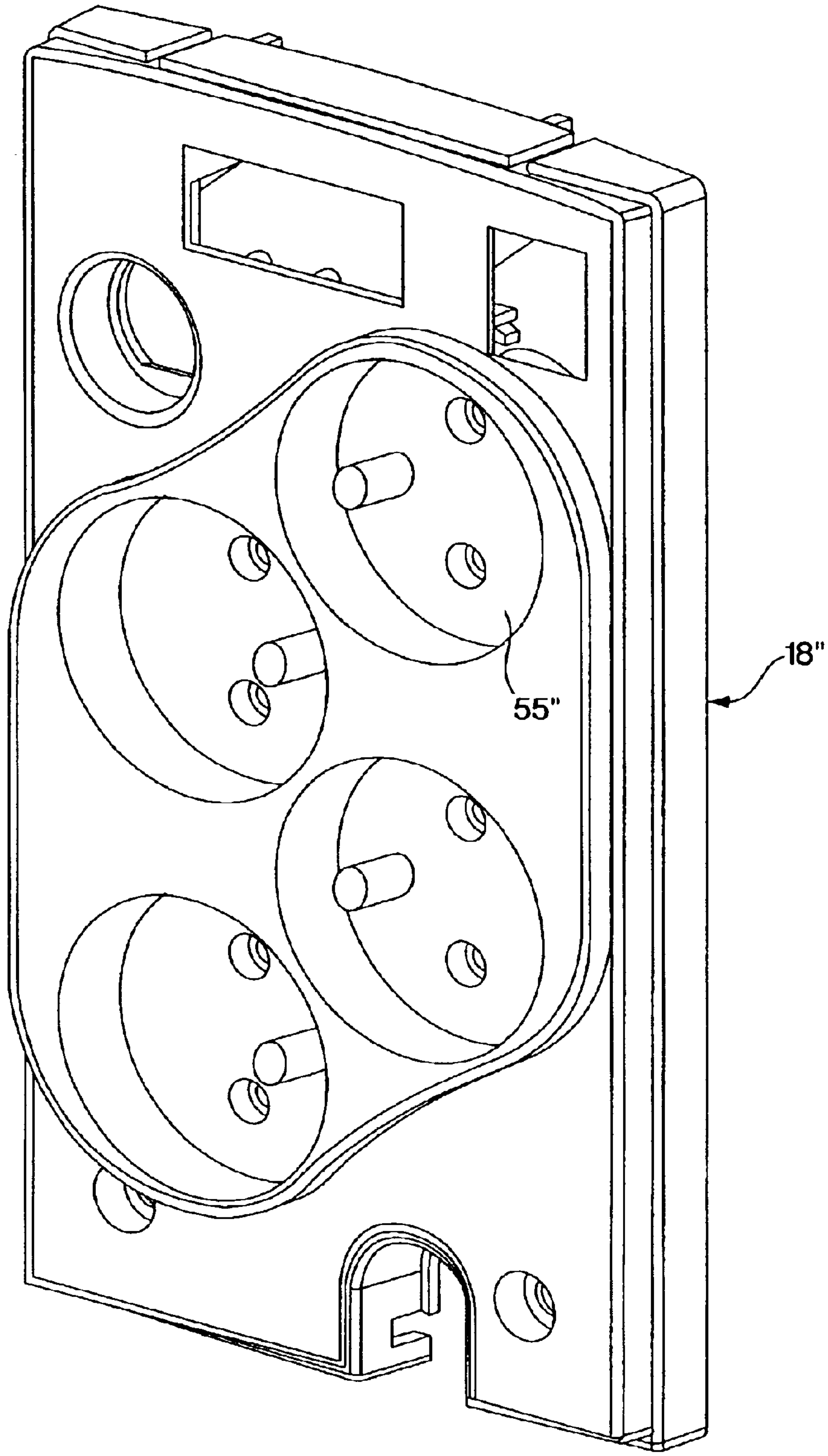
Figure 17F:
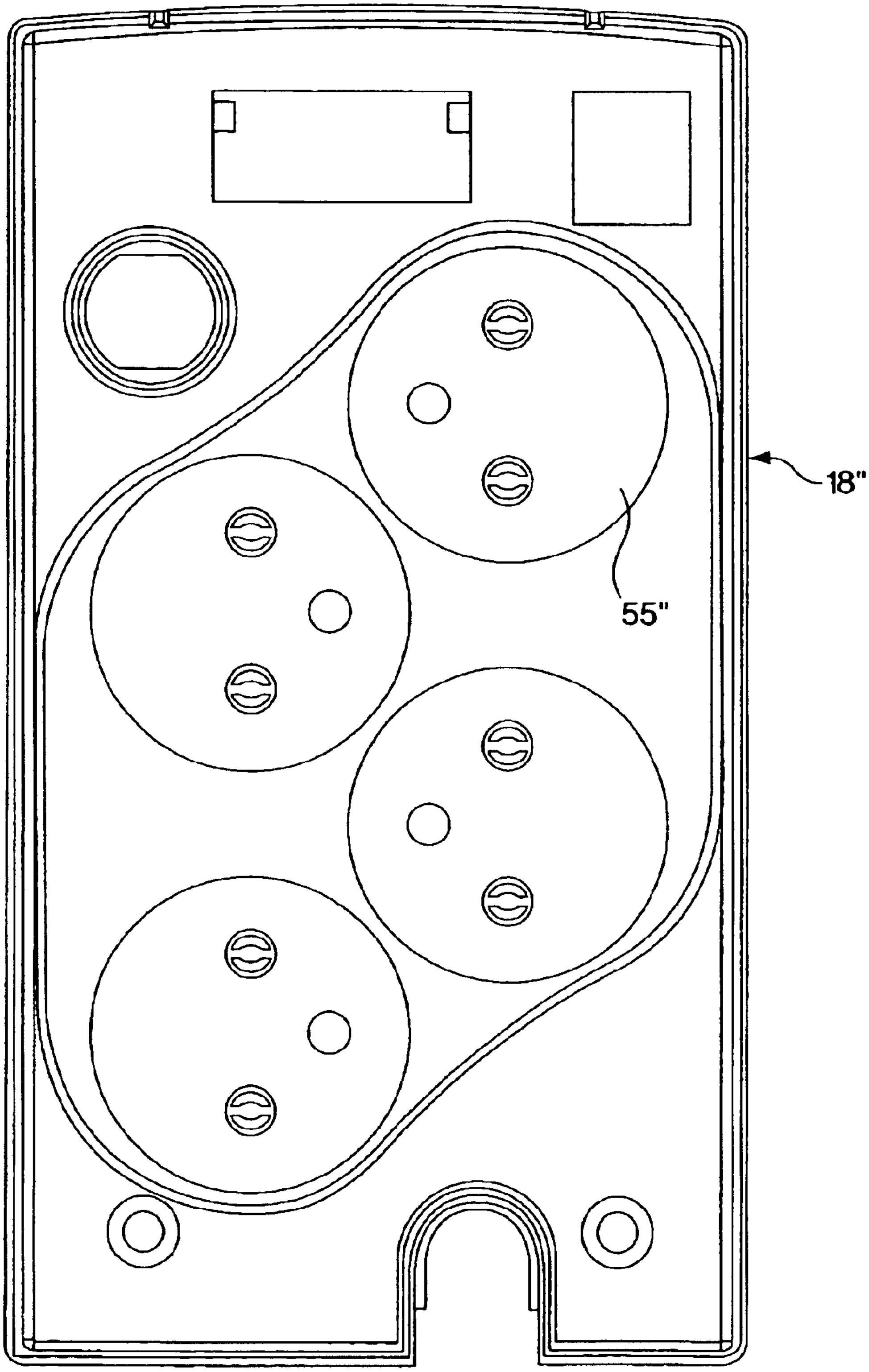
Figure 17G:
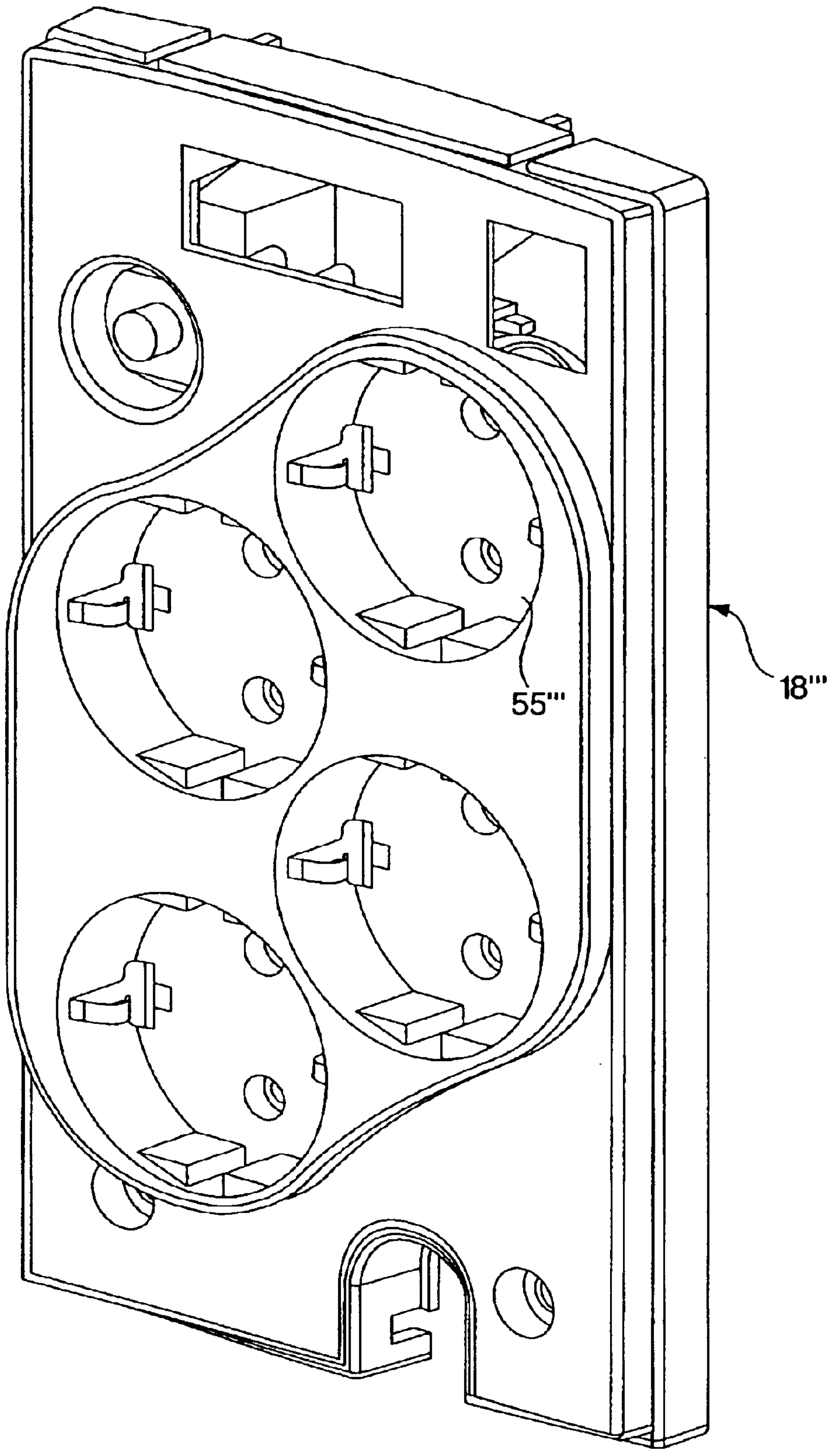
Figure 17H:
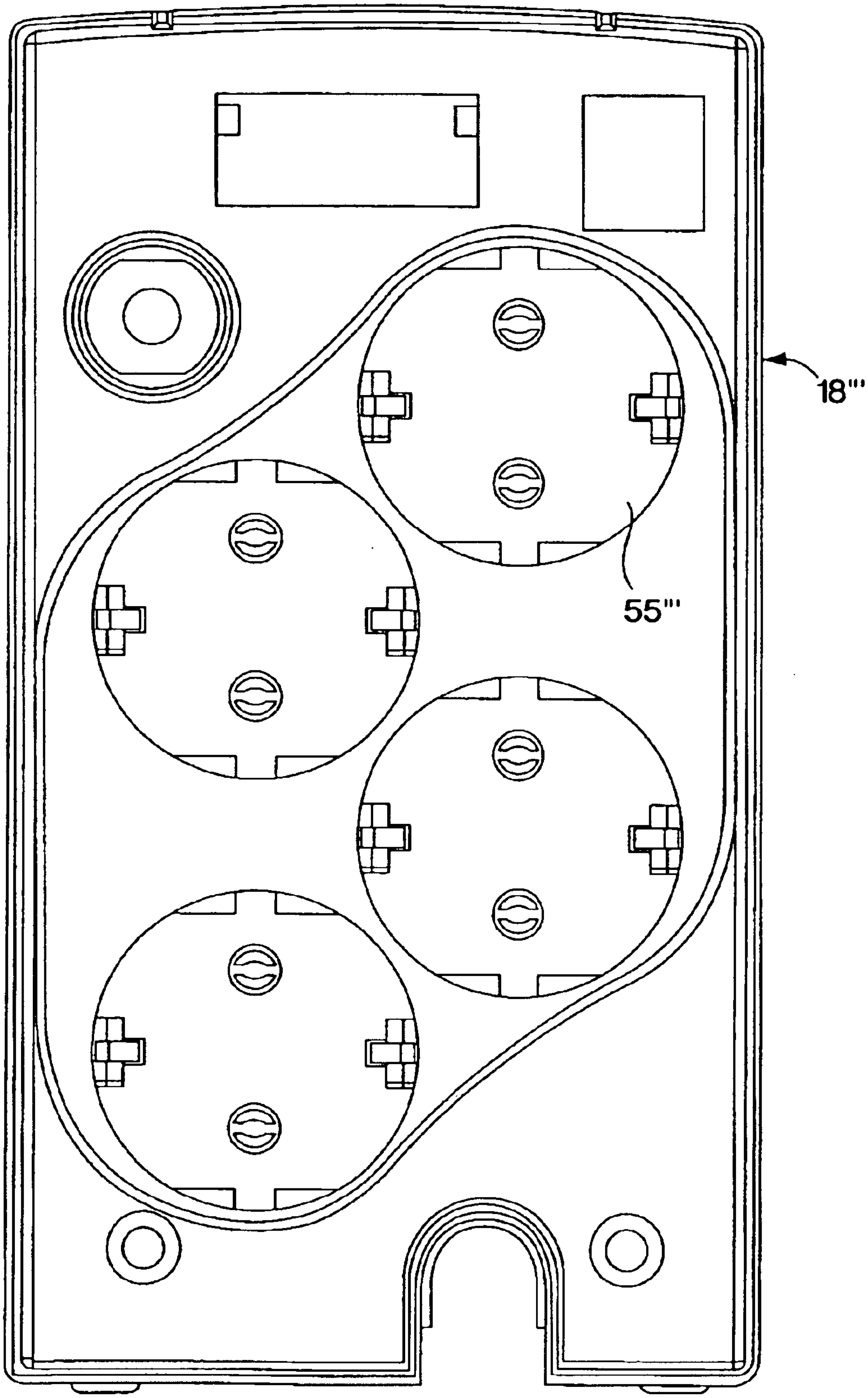
Figure 17I:
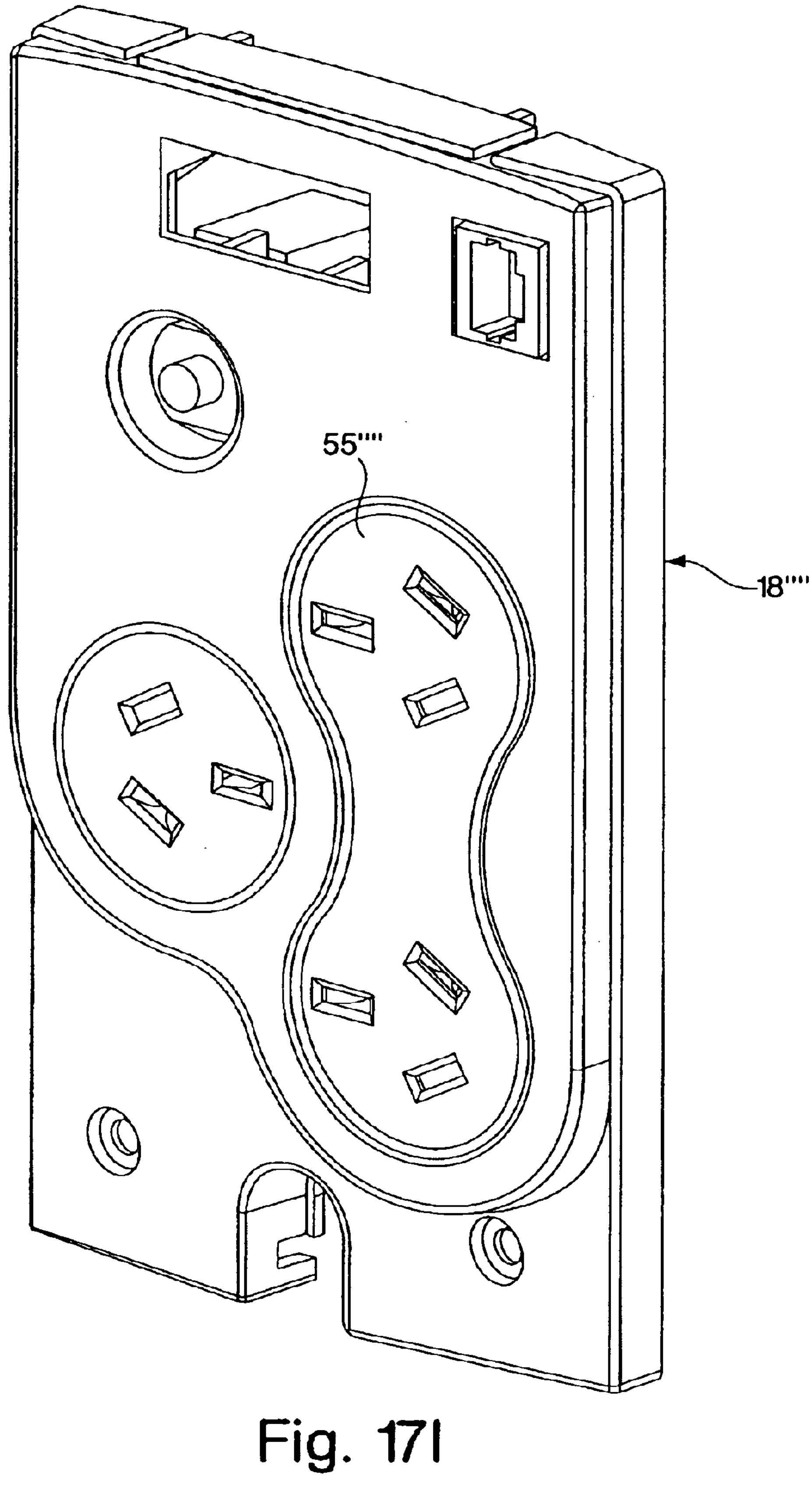
Figure 17J:
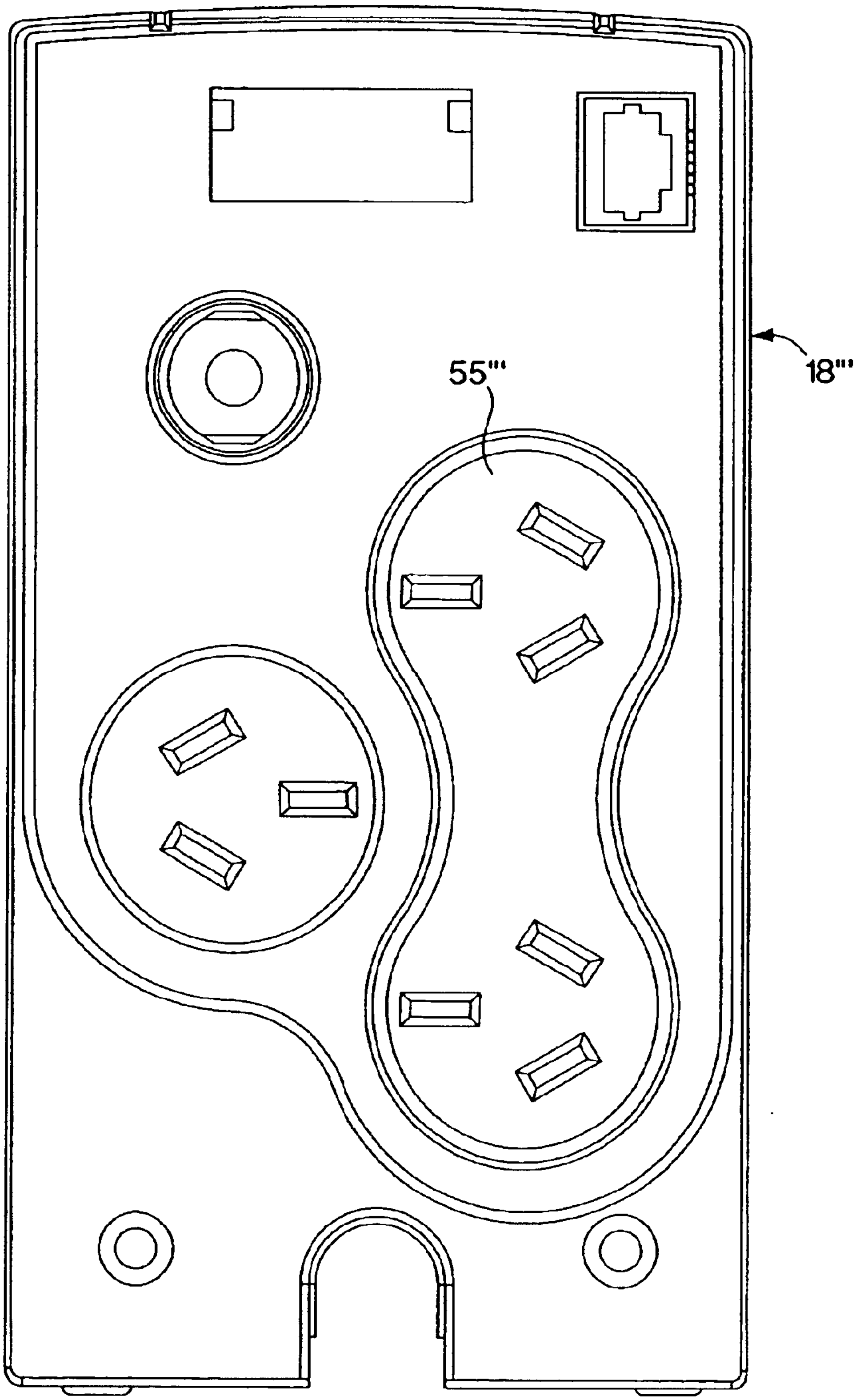

FIGS. 17A through 17J are examples of such alternate rear panels usable with the present invention. FIGS. 17A and 17B are perspective and front views, respectively, of a rear panel 18 having receptacles 55 usable in locations such as the United States. FIGS. 17C and 17D are perspective and front views, respectively, of a rear panel 18' having so-called "international" receptacles 55'. FIGS. 17E and 17F are perspective and front views, respectively, of a rear panel 18" having receptacles 55" usable in regions such as France. FIGS. 17G and 17H are perspective and front views, respectively, of a rear panel 18''' having receptacles 55''', usable in regions such as Germany. FIGS. 17I and 17J are perspective and front views, respectively, of a rear panel 18"" having receptacles 55"" usable in regions such as China. Those skilled in the art will, of course, recognize that the various styles of rear panels illustrated in FIGS. 17A through 17J are merely representative of the different styles of rear panels that can be implemented to meet the particular voltage and receptacle needs of a particular region. Many other designs for the rear panel 18 are possible in accordance with the invention.

It should be understood that the present invention is not limited to providing a chassis for a UPS but may also be used to provide a lightweight, inexpensive, sturdy chassis for virtually any type of electronic instrument.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. An uninterruptible power supply for providing AC power to a load, the uninterruptible power supply comprising:

an input to receive AC power from an AC power source;

an output that provides AC power;

a DC voltage source that provides DC power, the DC voltage source having an energy storage device;

an inverter operatively coupled to the DC voltage source to receive DC power and to provide AC power;

a transfer switch constructed and arranged to select one of the AC power source and the DC voltage source as an output power source for the uninterruptible power supply;

a chassis for housing at least the DC voltage source, inverter, and transfer switch, the chassis comprising:

a first panel having a substantially "E" or "U" shaped appearance;

a second panel constructed and arranged to mate to the first panel; and a first fastener securing the first panel and the second panel into a substantially fixed configuration; and a door movably coupled to the chassis between an open position and a closed position, the DC voltage source being substantially enclosed by the door and the chassis when the door is in the closed position, and the DC voltage source being accessible through the chassis when the door is in the open position.

2. The uninterruptible power supply of claim 1 further comprising a printed circuit board comprising at least one electronic component, wherein at least one of the first and second panels further comprises at least one integrated fastener constructed and arranged to attach the printed circuit board to the respective panel.

3. The uninterruptible power supply of claim 1, wherein at least one of the first panel and second panel further includes at least one crush rib constructed and arranged to hold a component disposed adjacent to the crush rib in a substantially fixed position.

4. The uninterruptible power supply of claim 1, wherein the second panel further comprises an integrally formed compartment.

5. The uninterruptible power supply of claim 4 wherein the compartment is constructed and arranged to enclose the energy storage device.

6. The uninterruptible power supply of claim 5 further comprising a movable access panel providing access to the compartment.

7. The uninterruptible power supply of claim 1 wherein the door comprises a plurality of integral door ribs configured and disposed to inhibit wires associated with the DC voltage source being pulled by the door when the door is moved between the open and closed positions.

8. The uninterruptible power supply of claim 1 wherein the door comprises a plurality of integral ramp ribs configured and disposed to inhibit the door from at least one of catching on and damaging a label of the DC voltage source when the door is moved between the open and closed positions.

9. The uninterruptible power supply of claim 1 wherein the chassis comprises a positive stop configured and disposed to inhibit insertion of a printed circuit board into the chassis beyond a desired insertion amount.

10. The uninterruptible power supply of claim 1 wherein the chassis comprises integral bus bar support members configured and disposed to retain a plurality of bus bars to provide electrical connections for power output receptacles provided by the uninterruptible power supply.

11. The uninterruptible power supply of claim 1 wherein the compartment is configured to receive a transformer of the DC voltage supply and the chassis comprises a crush rib configured and disposed to help retain the transformer in the compartment.

12. An uninterruptible power supply for providing AC power to a load, the uninterruptible power supply comprising:

an input to receive AC power from an AC power source;

an output that provides AC power;

a DC voltage source that provides DC power, the DC voltage source having an energy storage device;

an inverter operatively coupled to the DC voltage source to receive DC power and to provide AC power;

a transfer switch constructed and arranged to select one of the AC power source and the DC voltage source as an output power source for the uninterruptible power supply; and a chassis for housing at least the DC voltage source, inverter, and transfer switch, the chassis comprising:

a first panel having one of a substantially "L," "E," or "U" shaped appearance;

a second panel constructed and arranged to mate to the first panel, wherein the first and second panels comprise mating receptacles and protrusions disposed on internal portions of the chassis and disposed and configured such that the protrusions are received by the receptacles with the first and second panels connected to form at least a portion of the chassis, the mating receptacles and protrusions being disposed along at least two sides of the chassis; and a fastener securing the first panel and the second panel into a substantially fixed configuration.

13. The uninterruptible power supply of claim 12 further comprising a door movably coupled to the chassis between an open position and a closed position, the DC voltage source being substantially enclosed by the door and the chassis when the door is in the closed position, and the DC voltage source being accessible through the chassis when the door is in the open position.

14. The uninterruptible power supply of claim 12 wherein the chassis includes at most two fasteners to secure the first panel and the second panel into the substantially fixed configuration.

15. The uninterruptible power supply of claim 14 wherein the chassis comprises exactly two fasteners to secure the first panel and the second panel into the substantially fixed configuration.

16. The uninterruptible power supply of claim 14 wherein the chassis comprises exactly one fastener to secure the first panel and the second panel into the substantially fixed configuration.

* * * * *